United States Patent
Quirynen et al.

(10) Patent No.: US 11,753,023 B2
(45) Date of Patent: Sep. 12, 2023

(54) ADAPTIVE CONTROL OF AUTONOMOUS OR SEMI-AUTONOMOUS VEHICLE

(71) Applicant: Mitsubishi Electric Research Laboratories, Inc., Cambridge, MA (US)

(72) Inventors: Rien Quirynen, Cambridge, MA (US); Karl Berntorp, Watertown, MA (US); Stefano Di Cairano, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 367 days.

(21) Appl. No.: 16/746,919

(22) Filed: Jan. 19, 2020

(65) Prior Publication Data

US 2021/0221386 A1 Jul. 22, 2021

(51) Int. Cl.
*B60W 60/00* (2020.01)
*B60W 50/00* (2006.01)
(Continued)

(52) U.S. Cl.
CPC ........ *B60W 50/0097* (2013.01); *B60W 30/18* (2013.01); *B60W 60/001* (2020.02); *G05B 17/02* (2013.01); *G05D 1/0088* (2013.01); *B60W 2050/0014* (2013.01); *B60W 2050/0028* (2013.01); *B60W 2400/00* (2013.01); *G05D 2201/0213* (2013.01)

(58) Field of Classification Search
CPC ........... B60W 50/0097; B60W 60/001; B60W 30/18; B60W 2050/0014; B60W 2050/0028; B60W 2400/00; G05B 17/02; G05D 1/0088
See application file for complete search history.

(56) References Cited

U.S. PATENT DOCUMENTS

| | | | |
|---|---|---|---|
| 2019/0220703 A1* | 7/2019 | Prakash | G06N 20/00 |
| 2020/0158856 A1* | 5/2020 | Becker | G01S 13/867 |

(Continued)

FOREIGN PATENT DOCUMENTS

WO    WO-2019123682 A1 *  6/2019 ........... G05B 13/048

OTHER PUBLICATIONS

Safe and Interactive Autonomy: Control, Learning, and Verification by Dorsa Sadigh (Year: 2017).*

*Primary Examiner* — Elaine Gort
*Assistant Examiner* — Chanmin Park
(74) *Attorney, Agent, or Firm* — Gennadiy Vinokur; Hironori Tsukamoto

(57) ABSTRACT

A control system controls a vehicle using a probabilistic motion planner and an adaptive predictive controller. The probabilistic motion planner produces a sequence of parametric probability distributions over a sequence of target states for the vehicle with parameters defining a first and higher order moments. The adaptive predictive controller optimizes a cost function over a prediction horizon to produce a sequence of control commands to one or multiple actuators of the vehicle. The cost function balances a cost of tracking of different state variables in the sequence of the target states defined by the first moments. The balancing is performed by weighting different state variables using one or multiple of the higher order moments of the probability distribution.

20 Claims, 28 Drawing Sheets

(51) Int. Cl.
*B60W 30/18* (2012.01)
*G05B 17/02* (2006.01)
*G05D 1/00* (2006.01)

(56) References Cited

U.S. PATENT DOCUMENTS

| | | | |
|---|---|---|---|
| 2020/0207375 A1* | 7/2020 | Mehta | G05D 1/0212 |
| 2020/0356828 A1* | 11/2020 | Palanisamy | G05D 1/0246 |
| 2021/0132552 A1* | 5/2021 | Lawrence | G05B 6/02 |
| 2021/0148726 A1* | 5/2021 | Ostafew | G01C 21/3635 |
| 2021/0191347 A1* | 6/2021 | Bischoff | G05B 13/042 |
| 2021/0192748 A1* | 6/2021 | Morales Morales | G06T 7/20 |

* cited by examiner

| Control Objectives | Probabilistic Control Functions |
|---|---|
| 400 Stay on the road | stay-on-road function |
| 410 Stay in the middle of the lane | middle-lane function |
| 420 Maintain nominal speed | maintain-speed function |
| 430 Maintain safety margin to surrounding obstacles | safety-margin function |
| 440 Maintain minimum distance to vehicles in the same lane | minimum-headway function |
| 450 Drive smoothly | smooth-drive function |
| 460 Increase speed to speed limit | speed-limit function |
| 470 Change lane | change-lane function |
| 480 Minimize idling at intersection | intersection-crossing function |

FIG. 4A

Algorithm 1 Automatic Tuning for NMPC Tracking Cost using higher order Moments from Probabilistic Motion Planner.

Input: Reference $\{y_k^{ref}\}_{k=0,...}$ and covariance matrices $\{P_k\}_{k=0,...}$. — 740
1: while true do  ▷ Control loop
2:     if new reference motion plan then ~ 741
3:         Reset trajectories: $\{y_k^{ref}\}_{k=0,...}$ and $\{P_k\}_{k=0,...}$. ~ 742
4:         Smooth approximation $y^{ref}(\cdot)$ of reference motion. ~ 743
5:     for $k = 0, \ldots, N$ do
6:         Automatic tuning: compute $W_k$ using covariance $P_k$. ~ 730
7:     Wait for next step after sampling time $T_s$. ~ 744
8: end while

FIG. 7C

ADAPTIVE CONTROL OF AUTONOMOUS OR SEMI-AUTONOMOUS VEHICLE

TECHNICAL FIELD

The present invention relates generally to controlling vehicles, and more particularly to controlling an autonomous or a semi-autonomous vehicle.

BACKGROUND

Autonomous vehicles are complex decision-making systems that require the integration of advanced and interconnected sensing and control components. At the highest level, a sequence of destinations is computed through the road network by a route planner. A discrete decision-making layer is responsible for determining the local driving goal of the vehicle. Each decision could be any of turn right, stay in lane, turn left, or come to full stop in a particular lane at an intersection. A sensing and mapping module uses various sensor information, such as radar, LIDAR, camera, and global positioning system (GPS) information, together with prior map information, to estimate the parts of the surroundings relevant to the driving scenario.

The outputs of motion planning are inputs to the vehicle controller. The motion planner is responsible for determining a safe, desirable and dynamically feasible trajectory that the vehicle should follow based on the outputs from the sensing and mapping module. A vehicle control algorithm then aims to track this reference motion, at a relatively high sampling frequency, by issuing commands, e.g., steering angle, wheel torque and brake force. Finally, an actuator control layer regulates the actuators to achieve these requested commands.

The motion-planning problem in autonomous vehicles shares many similarities with the standard robotics setup, and optimal solutions are in most cases intractable due to non-convexity of the problem. Approaches relying on direct dynamic optimization have been developed for specialized scenarios. However, due to non-convexity, this results only in locally optimal solutions, which may be significantly far from the globally optimal one, and possibly at the cost of a relatively large computational load and time. Motion planning is often performed using sampling-based methods such as rapidly-exploring random trees (RRTs), or graph-search methods such as A*, D* and other variations.

Some methods perform the sampling deterministically, while other methods, such as a method described in U.S. Pat. No. 9,568,915, use probabilistic sampling. The sampling techniques are suitable for fast machine calculation, but the path generated by the sampling methods may feel unnatural for passengers in autonomous or semi-autonomous vehicles. Accordingly, there is still a need to improve path planning and control of autonomous or semi-autonomous vehicles.

SUMMARY

Some embodiments disclose an integrated architecture for (semi-) autonomous driving systems that involves a low-rate, long-term sampling-based motion planning algorithm and a high-rate, highly reactive optimization-based predictive vehicle controller. This integration enables a systematic and effective sharing in the burden of achieving multiple competing objectives by the motion planning and vehicle control layers, e.g., ensuring both the satisfaction of safety requirements, as well as ensuring a reliable and comfortable driving behavior in relatively complex highway and urban driving scenarios.

The motion planner computes a first moment of the reference trajectory to be tracked, and it computes higher order moments that define the corresponding confidence bounds for the planned trajectory. As our planning algorithm generates both a target trajectory and its confidence, e.g., in terms of covariance matrices, rather than using only the former as target to be tracked by the controller, here we use also the latter, specifically for tuning the time-varying tracking cost function in the optimal control problem formulation of the predictive controller. This results in an automatic tuning mechanism for the tradeoff between multiple competing objectives. In fact, the confidence associated to the trajectory indicates how much the path planner believes that its computed trajectory is effective. By using the confidence information for auto-tuning the cost function of the predictive controller, we allow more deviations when such confidence is low, and fewer deviations when such confidence is relatively high.

Some embodiments of the invention are based on a probabilistic method for motion planning, using particle filtering for approximating the involved probability density functions (PDFs). Since the particle-filter based motion planner computes the PDF of the state trajectory, higher-order moments than the weighted mean can be determined. For instance, by computing the covariance matrices (i.e., the second moment) along the weighted mean, we can determine a Gaussian approximation of the desired reference trajectory that is used directly to formulate and adapt the tracking cost function in the predictive controller.

Some embodiments of the invention use an implementation of the vehicle control layer that is based on an adaptive implementation of linear or nonlinear model predictive control (MPC) with a time-varying formulation of a stage-wise least squares cost function. In particular, time-varying tracking weight matrices can be used to define the MPC cost function. Because the path planner provides both first and higher-order moments for the planned motion trajectory, this information can be used directly to tune both the reference values and the weighting matrices in the stage-wise least squares tracking cost function.

Some embodiments are based on an inverse proportional relation between the uncertainty of the motion planner and the tracking cost in the MPC problem, resulting in a time-varying sequence of weighting matrices. More specifically, one expects the uncertainty of the reference motion plan to increase when the vehicle is predicted to become relatively close to safety-related constraints of the vehicle, such that the penalization of deviations from the reference trajectories should decrease, and vice versa. This in turn, respectively, allows larger, or lower, deviations of the MPC predicted state and/or control trajectories from its reference, i.e., the motion planning trajectory.

For autonomous vehicles, using simple moments such as variance is not enough for the safe operation of a vehicle. For instance, consider the case when there is a vehicle in front of the autonomous vehicle, and it is possible to both stay behind the vehicle or overtake it by changing lane. If the motion planner has determined the distribution of possible trajectories, determining a variance for that distribution will cause over-conservativeness and result in inferior performance.

Consequently, one embodiment resolves this conservativeness by determining different modes from the distribution. For instance, one mode is a distribution of possible trajectories that correspond to lane keeping, and another mode is a distribution of possible trajectories that correspond to changing lane. Based on these different modes, it is possible to compute variances for each individual mode, thus reducing conservativeness.

Some embodiments are based on the realization that the motion planner can utilize information about the particular current condition of the vehicle control algorithm. For instance, MPC is based on a constrained optimization method that includes obstacle avoidance inequality constraints. If the variance propagated from the motion planner to the MPC is relatively small, the MPC controller may activate the obstacle-avoidance constraints unnecessarily, resulting in non-smooth trajectories. To this end, in one embodiment of the invention, MPC informs the motion planner about the most current amount of constraint activations and/or constraint violations in the predicted state and control trajectories of MPC that can be used for adjusting the confidence, i.e., increasing or decreasing the variance for the distribution of trajectories in the motion planner. This results in added safety and improved smoothness of the planned reference trajectory.

Different embodiments use different time scales for the real-time operation of the motion planning and the vehicle control layers. For example, in one embodiment, the motion planner computes a long-term, highly predictive reference trajectory but it typically needs to run at a relatively low sampling frequency, i.e., it has a relatively slow update rate (e.g., every 1 second) and therefore rather low reactivity. Instead, MPC typically uses a much shorter prediction horizon but it runs at a much higher sampling frequency (e.g., every 25 milliseconds), such that the controller can be highly reactive to local deviations, e.g., due to uncertainties in the pose estimation for the ego vehicle as well as for the surrounding obstacles. It is therefore important to share the responsibility between the planning and control layer for ensuring a safe and reliable driving behavior, especially in order to satisfy safety requirements in real-time and under uncertainty.

Accordingly, one embodiment discloses a system for controlling a vehicle that includes an input interface configured to accept a current state of the vehicle, an image of an environment in proximity to the current state of the vehicle, and a destination of the vehicle; a memory configured to store a probabilistic motion planner and an adaptive predictive controller, wherein the probabilistic motion planner is configured to accept the current state of the vehicle, the destination of the vehicle, and the image of the environment to produce a sequence of parametric probability distributions over a sequence of target states defining a motion plan for the vehicle, wherein parameters of each parametric probability distribution define a first order moment and at least one higher order moment of the probability distribution, wherein the adaptive predictive controller is configured to optimize a cost function over a prediction horizon to produce a sequence of control commands to one or multiple actuators of the vehicle, wherein the optimization of the cost function balances a cost of tracking of different state variables in the sequence of the target states defined by the first moments, wherein the different state variables are weighted using one or multiple of the higher order moments of the probability distribution in the balancing of the cost of tracking; a processor configured to execute the probabilistic motion planner by submitting the current state of the vehicle, the destination of the vehicle, and the image of the environment to the probabilistic motion planner and configured to execute the adaptive predictive controller by submitting the sequence of the parametric probability distributions produced by the probabilistic motion planner to the adaptive predictive controller to produce the sequence of control commands; and an output interface configured to output at least one control command determined by the adaptive predictive controller to at least one actuator of the vehicle.

Another embodiment discloses a method for controlling a vehicle, wherein the method uses a processor coupled to a memory storing a probabilistic motion planner and an adaptive predictive controller, wherein the probabilistic motion planner is configured to accept the current state of the vehicle, the destination of the vehicle, and the image of the environment to produce a sequence of parametric probability distributions over a sequence of target states defining a motion plan for the vehicle, wherein parameters of each parametric probability distribution define a first order moment and at least one higher order moment of the probability distribution, wherein the adaptive predictive controller is configured to optimize a cost function over a prediction horizon to produce a sequence of control commands to one or multiple actuators of the vehicle, wherein the optimization of the cost function balances a cost of tracking of different state variables in the sequence of the target states defined by the first moments, wherein the different state variables are weighted using one or multiple of the higher order moments of the probability distribution in the balancing of the cost of tracking, wherein the processor is coupled with stored instructions implementing the method, wherein the instructions, when executed by the processor carry out steps of the method that includes accepting a current state of the vehicle, an image of an environment in proximity to the current state of the vehicle, and a destination of the vehicle; executing the probabilistic motion planner by submitting the current state of the vehicle, the destination of the vehicle, and the image of the environment to the probabilistic motion planner; executing the adaptive predictive controller by submitting the sequence of the parametric probability distributions produced by the probabilistic motion planner to the adaptive predictive controller to produce the sequence of control commands; and submitting at least one control command determined by the adaptive predictive controller to at least one actuator of the vehicle.

Yet another embodiment discloses a non-transitory computer readable storage medium embodied thereon a program executable by a processor for performing a method, wherein the medium stores a probabilistic motion planner and an adaptive predictive controller, wherein the probabilistic motion planner is configured to accept the current state of the vehicle, the destination of the vehicle, and the image of the environment to produce a sequence of parametric probability distributions over a sequence of target states defining a motion plan for the vehicle, wherein parameters of each parametric probability distribution define a first order moment and at least one higher order moment of the probability distribution, wherein the adaptive predictive controller is configured to optimize a cost function over a prediction horizon to produce a sequence of control commands to one or multiple actuators of the vehicle, wherein the optimization of the cost function balances a cost of tracking of different state variables in the sequence of the target states defined by the first moments, wherein the different state variables are weighted using one or multiple of the higher order moments of the probability distribution in the balancing of the cost of tracking.

The method includes accepting a current state of the vehicle, an image of an environment in proximity to the current state of the vehicle, and a destination of the vehicle; executing the probabilistic motion planner by submitting the current state of the vehicle, the destination of the vehicle, and the image of environment to the probabilistic motion planner; executing the adaptive predictive controller by submitting the sequence of the parametric probability distributions produced by the probabilistic motion planner to the adaptive predictive controller to produce the sequence of control commands; and submitting at least one control command determined by the adaptive predictive controller to at least one actuator of the vehicle.

BRIEF DESCRIPTION OF THE DRAWINGS

FIG. 4A illustrates an exemplar list of possible control objectives of the vehicle behavior for driving on roads and their corresponding control functions in the motion planner according to some embodiments.

FIG. 7C is an algorithm description for the automatic tuning of the time-varying reference tracking cost of the adaptive MPC controller, using a sequence of reference values and covariance matrices from the probabilistic motion planner.

DETAILED DESCRIPTION

Some embodiments of the invention provide a system and a method for controlling an operation of a system or a system using a predictive controller. An example of the predictive controller is a model predictive control (MPC) determining control inputs based on a model of the controlled system.

Figure 1:
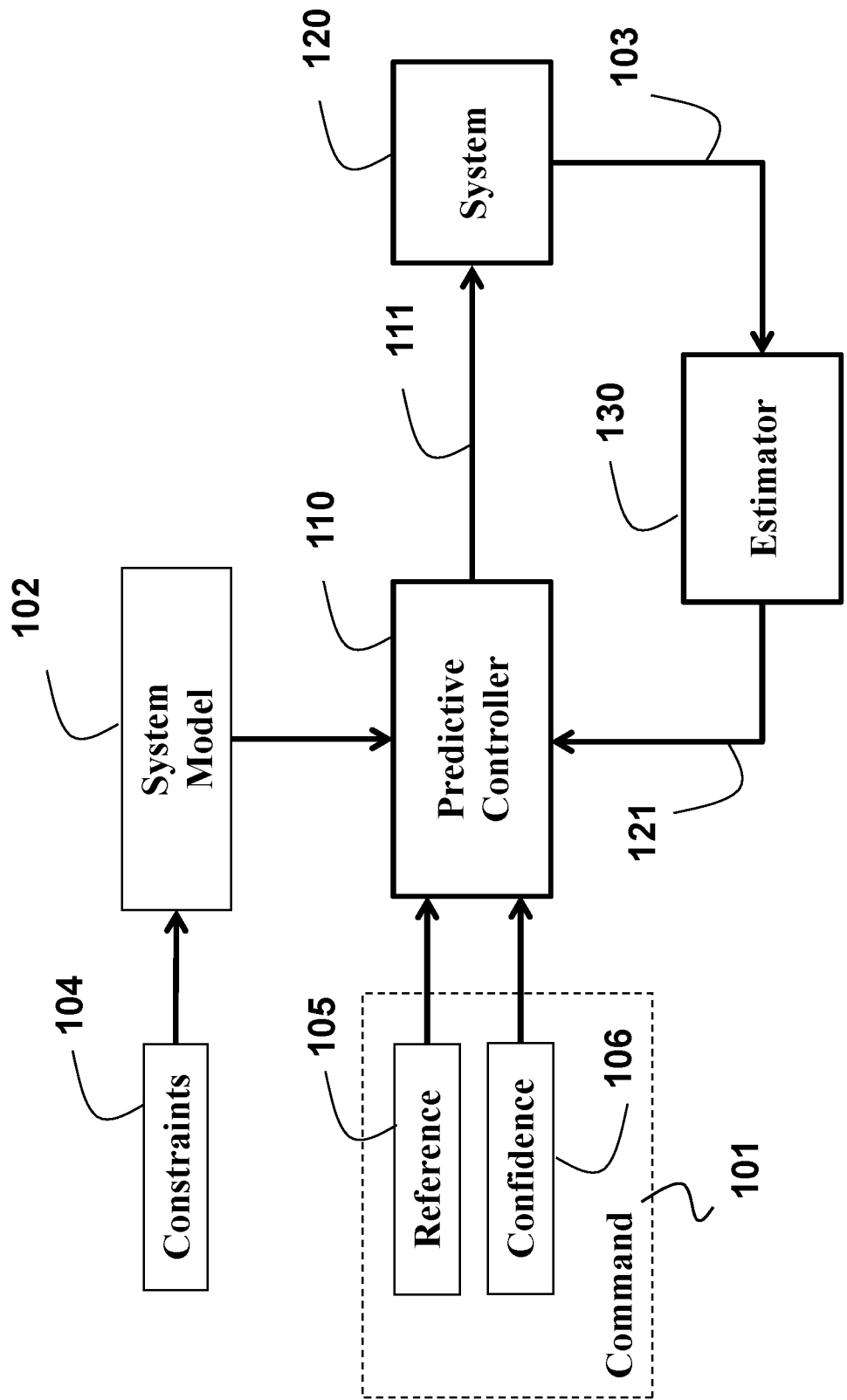
FIG. 1 is a block diagram of a predictive controller and feedback system according to some embodiments.

FIG. 1 shows an example system 120 connected to a predictive controller 110 via a state estimator 130 according to some embodiments. In some implementations, the predictive controller is an MPC controller programmed according to a dynamical model 102 of the system. The model can be a set of equations representing changes of the state and output 103 of the system 120 over time as functions of current and previous inputs 111 and previous outputs 103. The model can include constraints 104 that represent physical and operational limitations of the system. During the operation, the controller receives a command 101 indicating the desired behavior of the system. The command can be, for example, a motion command. In response to receiving the command 101, the controller generates a control signal 111 that serves as an input for the system. In response to the input, the system updates the output 103 of the system. Based on measurements of the output of the system 103, the estimator updates the estimated state of the system 121. This estimated state of the system 121 provides the state feedback to the controller 110.

The system 120, as referred herein, can be any machine or device controlled by certain manipulation input signals 111 (inputs), possibly associated to physical quantities such as voltages, pressures, forces, torques, and to return some controlled output signals 103 (outputs), possibly associated to physical quantities such as currents, flows, velocities, positions indicative of a transition of a state of the system from a previous state to the current state. The output values are related in part to previous output values of the system, and in part to previous and current input values. The dependency on previous inputs and previous outputs is encoded in the state of the system. The operation of the system, e.g., a motion of components of the system, can include a sequence of output values generated by the system following the application of certain input values.

A model of the system 102 can include a set of mathematical equations that describe how the system outputs change over time as functions of current and previous inputs, and the previous outputs. The state of the system is any set of information, in general time varying, for instance an appropriate subset of current and previous inputs and outputs, that, together with the model of the system and future inputs, can uniquely define the future motion of the system.

The system can be subject to physical limitations and specification constraints 104 limiting the range where the outputs, the inputs, and also possibly the states of the system are allowed to operate.

The controller 110 can be implemented in hardware or as a software program executed in a processor, e.g., a microprocessor, which at fixed or variable control period sampling intervals receives the estimated state of the system 121 and the desired motion command 101 and determines, using this information, the inputs, e.g., the control signal 111, for operating the system.

The command 101 can include a reference command 105 and a representation of a confidence 106 of that reference command 105. For example, the command 101 can include a reference motion 105 and confidence bounds 106 around that reference motion. In some embodiments of the invention, the reference motion 105 can be represented by a reference trajectory of state and/or output values and the confidence bounds can be represented by covariance matrices that define the uncertainty around the reference trajectory of state and/or output values. In some embodiments of the invention, the command 101 is computed by a probabilistic motion planner and the reference motion 105 corresponds to the first moment and the confidence 106 corresponds to the second or higher order moments of the statistics for the motion plan.

The estimator 130 can be implemented in hardware or as a software program executed in a processor, either the same or a different processor from the controller 110, which at fixed or variable control period sampling intervals receives the outputs of the system 103 and determines, using the new and the previous output measurements, the estimated state 121 of the system 120.

Figure 2A:
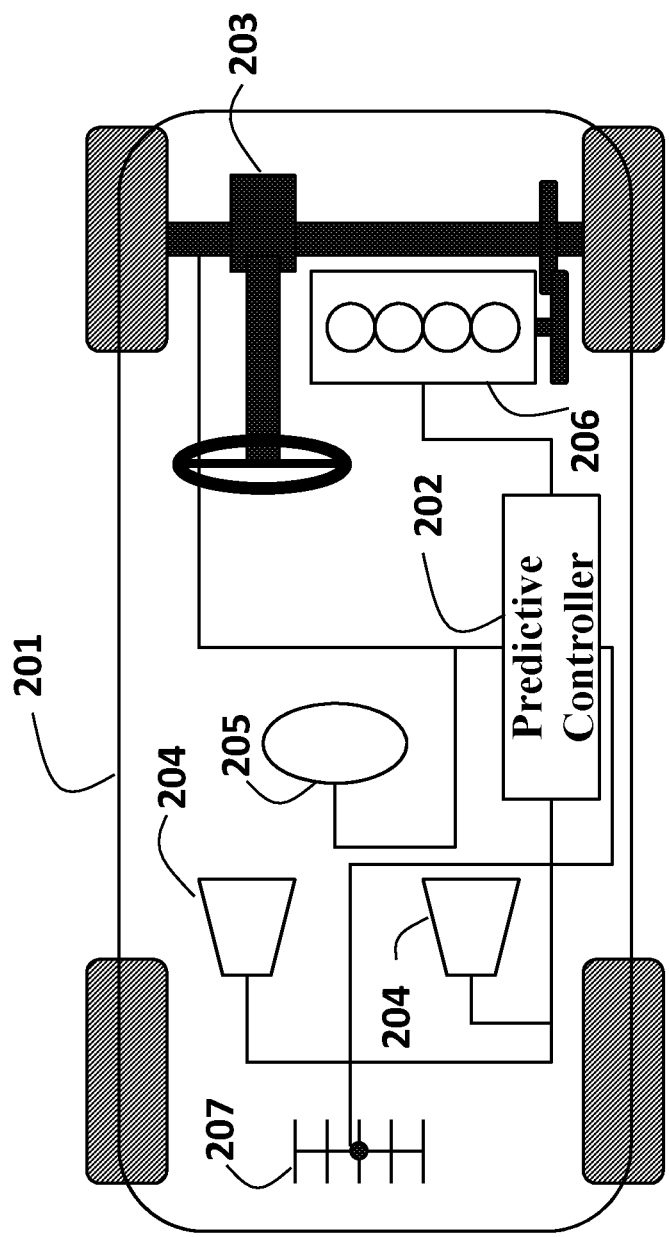
FIG. 2A is a schematic of a vehicle including a controller employing principles of some embodiments.

FIG. 2A shows a schematic of a vehicle 201 including a predictive controller 202 employing principles of some embodiments. As used herein, the vehicle 201 can be any type of wheeled vehicle, such as a passenger car, bus, or rover. Also, the vehicle 201 can be an autonomous or semi-autonomous vehicle. For example, some embodiments control the motion of the vehicle 201. Examples of the motion include lateral motion of the vehicle controlled by a steering system 203 of the vehicle 201. In one embodiment, the steering system 203 is controlled by the controller 202. Additionally, or alternatively, the steering system 203 can be controlled by a driver of the vehicle 201.

The vehicle can also include an engine 206, which can be controlled by the controller 202 or by other components of the vehicle 201. The vehicle can also include one or more sensors 204 to sense the surrounding environment. Examples of the sensors 204 include distance range finders, radars, lidars, and cameras. The vehicle 201 can also include one or more sensors 205 to sense its current motion quantities and internal status. Examples of the sensors 205 include global positioning system (GPS), accelerometers, inertial measurement units, gyroscopes, shaft rotational sensors, torque sensors, deflection sensors, pressure sensors, and flow sensors. The sensors provide information to the controller 202. The vehicle can be equipped with a transceiver 207 enabling communication capabilities of the controller 202 through wired or wireless communication channels.

Figure 2B:
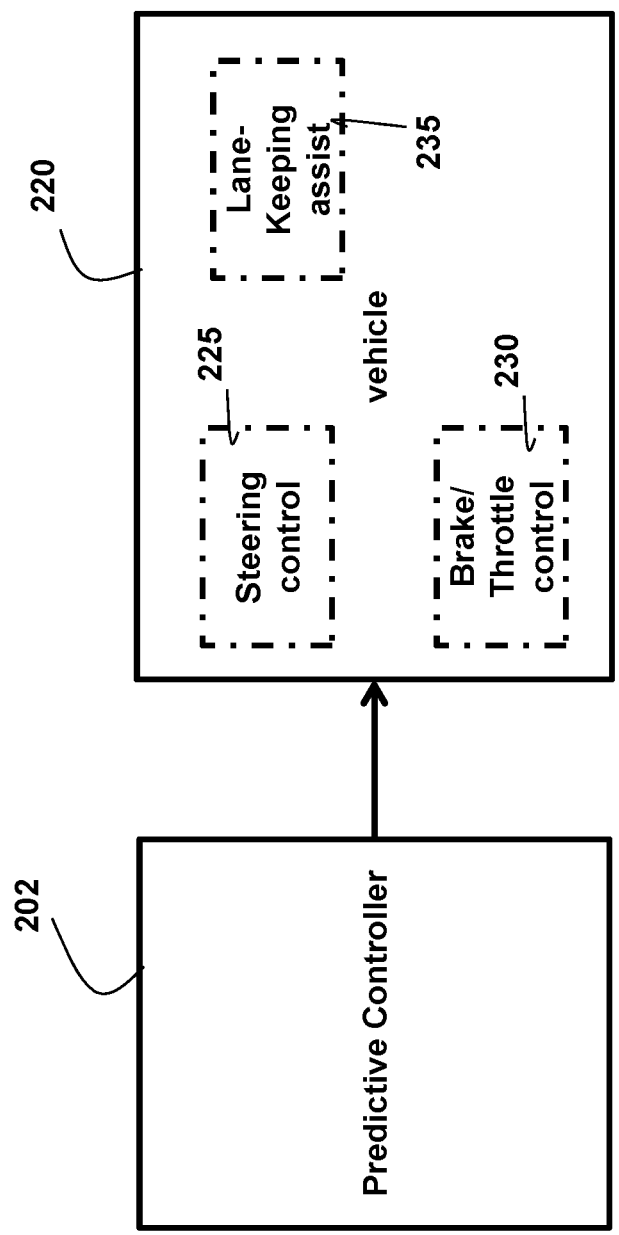
FIG. 2B is a schematic of interaction between the controller employing principles of some embodiments and controllers of the vehicle 201 according to some embodiments.

FIG. 2B shows a schematic of interaction between the predictive controller 202 and the controllers 220 of the vehicle 201 according to some embodiments. For example, in some embodiments, the controllers 220 of the vehicle 201 are steering 225 and brake/throttle controllers 230 that control rotation and acceleration of the vehicle 220. In such a case, the predictive controller 202 outputs control inputs to the controllers 225 and 230 to control the state of the vehicle. The controllers 220 can also include high-level controllers, e.g., a lane-keeping assist controller 235 that further process the control inputs of the predictive controller 202. In both cases, the controllers 220 use the outputs of the predictive controller 202 to control at least one actuator of the vehicle, such as the steering wheel and/or the brakes of the vehicle, in order to control the motion of the vehicle.

Figure 3A:
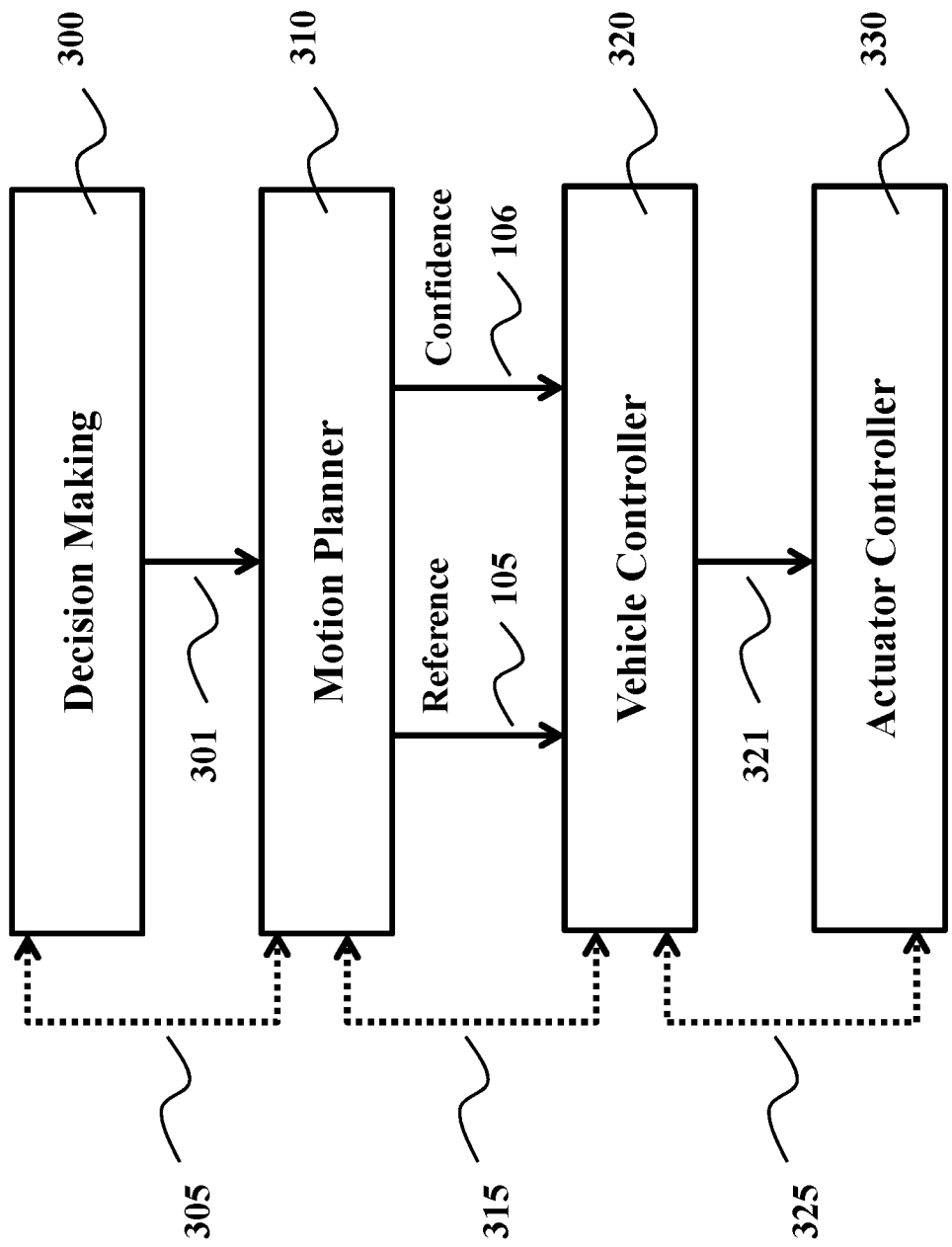
FIG. 3A shows a schematic of a multi-layer control structure that includes a decision maker, motion planner, vehicle controller and actuator controller, and the interchange of information between these layers.

FIG. 3A shows a schematic of a multi-layer control and decision making structure for an autonomous or semi-autonomous vehicle. Autonomous vehicles are complex systems that require the integration of advanced and interconnected sensing and control components. Embodiments of the invention include a motion planning layer 310 and a vehicle controller 320. The motion planner 310 computes the motion command 101 and provides it to the vehicle controller 320. Based on the reference 105 and confidence 106 in the motion command 101, the vehicle controller 320 computes control inputs 111 for the system to execute the motion command. Some embodiments of the invention additionally include a decision making layer 300 and/or an actuator controller 330.

At the highest level, a sequence of destinations can be computed through a road network by a route planner. Given the route, a discrete decision making layer 300 can be responsible for determining one or multiple local driving goals and corresponding discrete decisions 301 of the vehicle. Each decision could be any of turn right, stay in lane, turn left, or come to full stop in a particular lane at an intersection. The decision making layer 300 uses information from one or multiple sensors, such as radar, LIDAR, inertial measurement units, camera, and/or global positioning system (GPS) information, together with prior map information, to estimate the state of the system and parts of the surroundings that are relevant to the system for a particular driving scenario. The estimated information from the sensing and mapping modules can be made available to one, multiple or all of the control and decision making layers of the structure in FIG. 3A.

Based on one or multiple local destination goals 301, the motion planner 310 is responsible for determining a motion command 101 that is provided to the vehicle controller 320. In some embodiments, the motion command includes a reference command 105 and confidence bounds 106. In some embodiments, the reference command is a safe, desirable and dynamically feasible trajectory that the vehicle should follow based on the outputs from the decision making layer 300. Some embodiments of the invention are based on the realization that important requirements are that the reference trajectory 105 computed by the motion planner 310 is collision free, dynamically feasible, and possible to be tracked by the vehicle controller 320. This means that the reference trajectory achieves the one or multiple local driving goals while avoiding any collisions with the environment and respecting the dynamic model of the system 102 that can be represented by a set of mathematical equations.

Some embodiments of the invention are based on the realization that a typical limiting factor in the motion planning task is the non-convex nature of the corresponding constrained dynamic optimization problem. This results in achieving only a locally optimal solution, which may be significantly far from the globally optimal one, and possibly in a very large computational load and time, even to find just a feasible solution. Motion planning can be performed, for example, using sampling-based methods such as rapidly-exploring random trees (RRTs), or graph-search methods such as A*, D* and other variations.

Figure 3B:
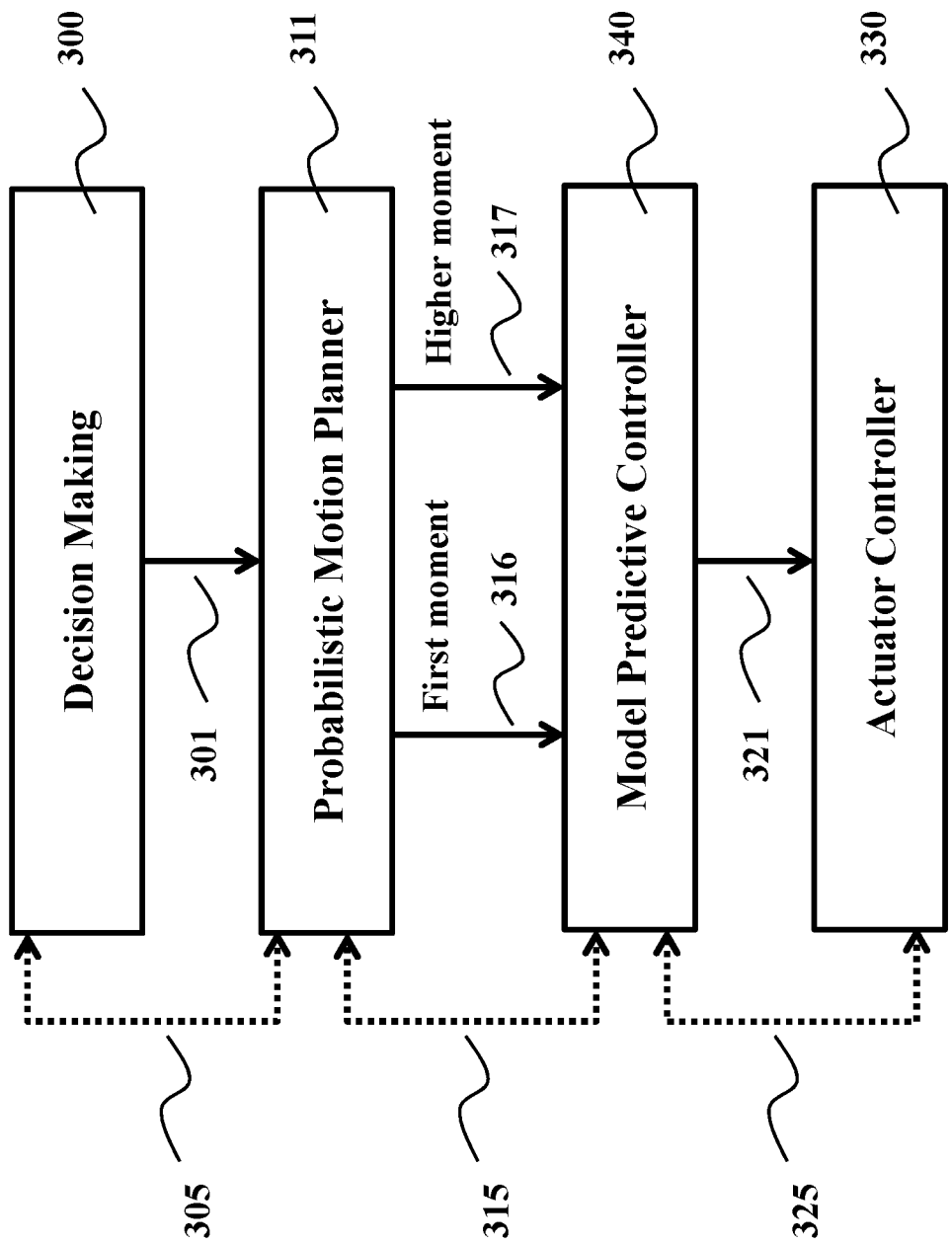
FIG. 3B shows a schematic of a multi-layer control structure that includes a decision maker, probabilistic motion planner, model predictive controller and actuator controller, and the interchange of information between these layers.

As illustrated in FIG. 3B, some embodiments of the invention use a probabilistic method for motion planning 311, for example, using particle filtering for approximating the involved probability density functions (PDFs). The driving requirements, such as staying on the road, left- or right-hand traffic, and obstacle avoidance, can be formulated as measurements for a nonlinear filtering problem. The resulting tree expansion can be different from a standard RRT algorithm in that a particle filtering based probabilistic motion planner 311 does not sample the state space, but rather the particle filtering based probabilistic motion planner instead samples the input space and add an additional correction term based on the driving requirements.

In some embodiments of the invention, the probabilistic motion planner 311 accepts the current state of the vehicle, the destination of the vehicle, and the image of the environment to produce a sequence of parametric probability distributions over a sequence of target state and/or output values defining a motion command for the vehicle, wherein parameters of each parametric probability distribution define a first order moment 316 and at least one higher order moment 317 of the probability distribution. In some embodiments of the invention, a cost function can be minimized by the probabilistic motion planner 311 such that a desirable behavior is achieved in the motion command for the vehicle.

Some embodiments of the invention are based on the realization that each target state of the vehicle can include multiple state variables, such that each parametric probability distribution in the probabilistic motion planner 311 is a multi-variable distribution defining parameters for the distribution of each state variable. In that case, the first moment of each parametric probability distribution is a mean value, and the higher order moment of the parametric probability distribution is a covariance matrix with values varying in space and time.

In some embodiments of the invention, the probabilistic motion planner 311 includes a particle filtering based algorithm having a set of particles propagated in time to represent a set of likelihoods of the target state at an instance of time, such that each particle includes a Gaussian distribution of values of the target state at the instance of time. In that case, the first order moment of the parametric probability distribution for the instance of time is a weighted mean of the particles, while the higher order moment of the parametric probability distribution for the instance of time is a weighted covariance of the particles.

As illustrated in FIGS. 3A and 3B, a vehicle controller 320 and/or 340 aims to realize this reference motion 105, taking into account the corresponding confidence bounds 106, by computing a control signal 321 for operating the system. The control signal may include one or multiple actuation commands such as values for, e.g., the steering angle, wheel torque and brake force. In some embodiments of the invention, the vehicle controller 320 provides the control signal 321 to an additional layer that consists of one or multiple controllers 330 that directly regulate the actuators to achieve the requested behavior of the vehicle.

Different embodiments of the invention can use different techniques in the vehicle controller 320 to track the reference motion 105 that is computed by a particular algorithm for the motion planner 310. In some embodiments of the invention, a model predictive controller 340 (MPC) is used in the vehicle control layer, such that the future information in the long-term motion plan can be used effectively in the predictive controller to achieve the desired behavior of the vehicle.

In some embodiments of the invention, a linear dynamic model is used in combination with linear constraints and a quadratic objective function, resulting in a linear model predictive controller (LMPC) to track the reference motion that is computed by the motion planner. In other embodiments of the invention, one or multiple of the constraint and/or objective functions can be nonlinear and/or the dynamic model equations that describe the vehicle state behavior can be nonlinear, resulting in a nonlinear model predictive controller (NMPC) to track the reference motion that is computed by the motion planner.

Some embodiments of the invention are based on the realization that the motion planner can compute a relatively long-term, highly predictive motion plan, but it typically needs to run at a relatively slow sampling frequency. For example, the motion planner can compute a reference motion for a future time period of 5-50 seconds while it can be executed only one or multiple times for every sampling time of one or multiple seconds, resulting in a highly predictive motion plan but a relatively low reactivity. Embodiments of the invention are based on the additional realization that the predictive controller can track the reference motion plan by computing a control signal over a relatively short prediction horizon but while running at a relatively high sampling frequency. For example, the vehicle controller can use a prediction horizon of 1-10 seconds while it can be executed 10-100 times per second. The vehicle controller can be highly reactive to local deviations due to uncertainties in the vehicle state estimation as well as other uncertainties in the sensing and mapping module, e.g., related to the obstacles in the surrounding environment of the vehicle.

In some embodiments of the invention, a rate of execution of the adaptive model predictive controller 340 is greater than a rate of execution of the probabilistic motion planner 311, such that the processor executes the MPC at least once for each execution of the motion planner. In some embodiments of the invention, the motion plan defines the sequence of parametric probability distributions over the sequence of target states as a function of time for a period greater than the length of the prediction horizon for the vehicle controller.

In some embodiments of the invention, a different dynamic model of the vehicle can be used in different components in the multi-layer control and decision making structure for an autonomous or semi-autonomous vehicle. For example, a relatively simple but computationally cheap kinematic model can be used in the motion planner, while a relatively accurate but computationally more expensive dynamic single- or double-track vehicle model can be used in the predictive controller.

As illustrated in FIGS. 3A and 3B, information can be shared between the different components in the multi-layer control and decision making structure for an autonomous or semi-autonomous vehicle. For example, information related to the map and the vehicle surroundings can be shared between the decision maker and the motion planner 305, between the motion planner and the vehicle controller 315, or between the vehicle controller and the actuator controller. In addition, some embodiments of the invention are based on the realization that reliability and safety can be improved for an autonomous or semi-autonomous vehicle by using diagnostic information such as, e.g., a performance metric of success and/or failure of the algorithm in one component that can be shared with the algorithm in another component of the multi-layer control and decision making structure.

Referring to FIG. 3B, the probabilistic motion planner 311 could use information 315 from the model predictive controller 340. For example, in one embodiment of the invention, the MPC controller solves a constrained dynamic optimization problem at each sampling time step and it uses the active set of constraints in each control solution to provide feedback to the probabilistic motion planner at each sampling time step. All constraints in the active set hold with equality in the control solution, while all of the remaining constraints are said to be inactive in the solution of the MPC controller. In some embodiments of the invention, the probabilistic motion planner 311 is configured to adjust the higher order moments of the probabilistic distribution based on the type and/or number of the active constraints in the MPC controller 340. This can be beneficial, for instance, when the behavior of the motion planner needs to be adjusted to environmental changes that have not or not yet been detected by the motion planner, in order to improve the overall behavior of the autonomous or semi-autonomous vehicle.

Figure 3C:
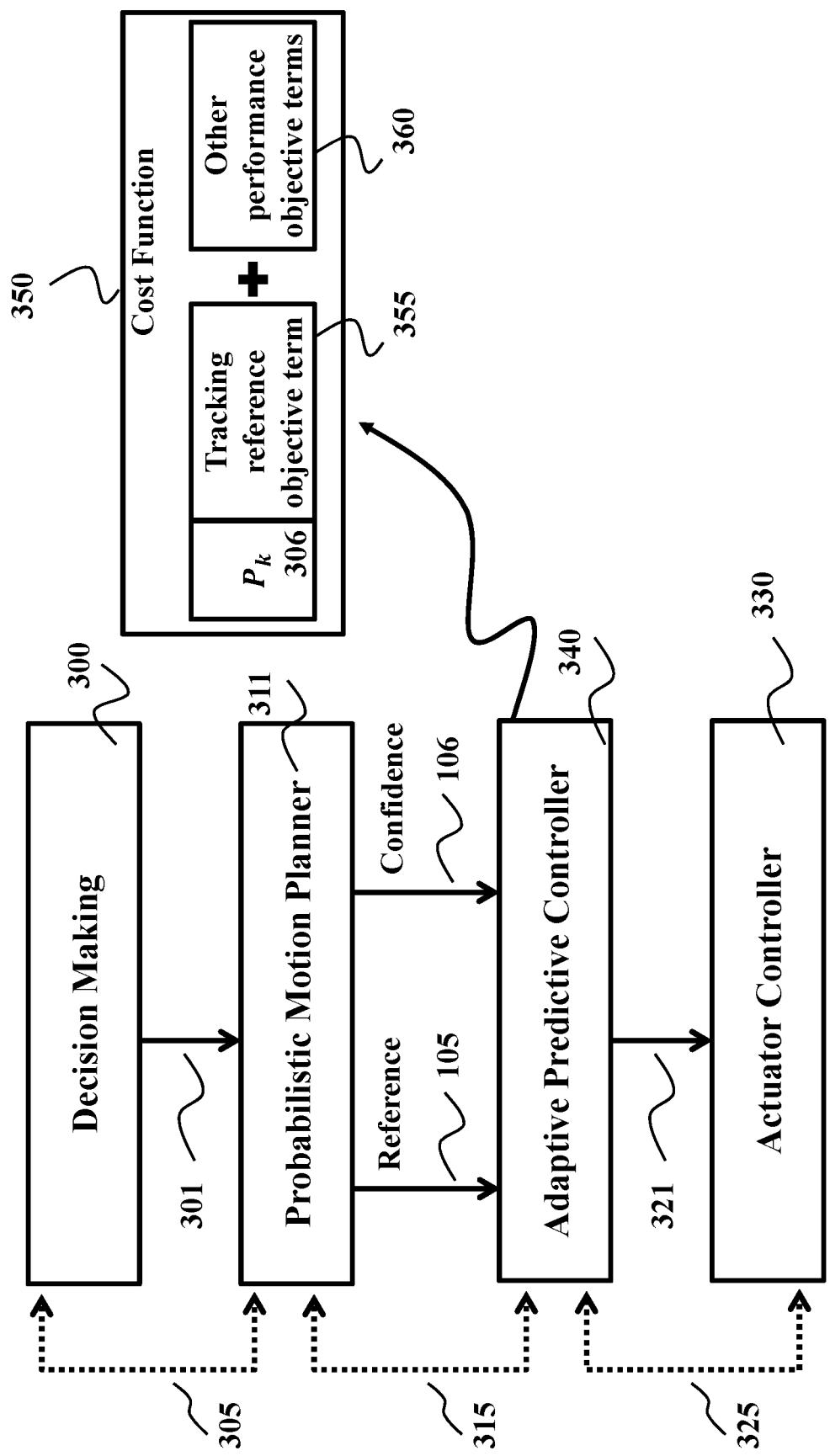
FIG. 3C illustrates the automatic tuning of one or multiple terms in the cost function of the model predictive controller in the multi-layer control structure based on the command information from the probabilistic motion planner.

FIG. 3C illustrates the automatic tuning of one or multiple terms in the cost function 350 of the model predictive controller 340 in the multi-layer control structure based on the reference command 105 and corresponding confidence 106 from the probabilistic motion planner 311. The adaptive MPC controller 340 is configured to optimize a cost function over a prediction horizon to produce a sequence of control commands to one or multiple actuators of the vehicle. In some embodiments of the invention, the optimization of the cost function 350 balances a cost of tracking the sequence of the target states 355, defined by the first moments of the parametric probability distributions 316, against a cost of at least one other metric of the motion of the vehicle 360.

Embodiments of the invention are based on the realization that the importance of the tracking cost can be weighted using a function of one or multiple of the higher order moments 317 of the parametric probability distributions. This automatic tuning of the cost function 350 in the adaptive predictive controller 340 based on the higher order moments 317 of the parametric probability distributions in the probabilistic motion planner 311 allows a sharing of the burden between the motion planner and the vehicle controller in achieving the control objectives, for example, ensuring safe obstacle avoidance, staying in a particular lane, driving at a desirable reference velocity and/or achieving a reliable, comfortable driving behavior in relatively complex scenarios.

The higher order moments 317 of the probability distributions indicate confidence of the probabilistic motion planner about the motion plan for the vehicle. In some embodiments of the invention, the adaptive predictive controller increases the weight of the tracking in the balancing optimization with an increase of the confidence allowing lower deviation of the predicted vehicle state values from the reference sequence of target states. In some embodiments of the invention, the adaptive predictive controller decreases the weight of the tracking in the balancing optimization with a decrease of the confidence allowing a larger deviation of the predicted vehicle state values from the reference trajectory.

In some embodiments of the invention, covariance matrices $P_k$ 306 are used to represent the second order moments of the probability distributions in the probabilistic motion planner. This time-varying sequence of covariance matrices $P_k$ 306 can be used to automatically tune the weighting of the time-varying reference tracking term 355, relatively with respect to other performance metrics 360, in the objective function of the adaptive MPC controller. Some embodiments of the invention are based on the realization that this results in an automatic tuning mechanism for the tradeoff between multiple competing control objectives. The confidence 106, in terms of covariance matrices $P_k$ 306, associated with the reference trajectory of target state and/or output values 105 indicates how much the motion planner believes that its computed trajectory is effective. By using the confidence information for auto-tuning the MPC cost function 350, we allow more deviations from the reference trajectory when such belief by the motion planner is low and fewer deviations when such belief is relatively high.

FIG. 4A shows an exemplar list of possible control objectives of the vehicle behavior for driving on roads and their corresponding control functions in the probabilistic motion planner according to some embodiments. The control functions transition the current state of the vehicle to a target state of the vehicle in accordance with a corresponding objective. The control functions can be designed analytically and/or learned from data. For example, one driving objective is to mandate the vehicle to stay on the road 400 and its corresponding stay-on-road function is configured to maintain a position of the vehicle within borders of a road. Possible additional driving objectives can mandate that the vehicle should drive in the middle of the lane 410 with a nominal velocity 420. Their corresponding control functions can include a middle-lane function configured to maintain the position of the vehicle in a middle of a lane and/or a maintain-speed function configured to maintain a desirable speed of the vehicle.

In another example, the driving objectives can also mandate the vehicle to maintain a safety margin 430 to surrounding obstacles using its corresponding safety-margin function configured to maintain a minimum distance between the vehicle and an obstacle on the road. Another possible driving objective is to maintain a safety distance to vehicles in the same lane 440. This can be achieved with corresponding minimum-headway function configured to maintain a minimum headway between the vehicle and a leading vehicle. For reasons of passenger comfort, fuel consumption, wear-and-tear, or other reasons, some embodiments of the invention aim to mandate a smooth driving behavior 450 of the vehicle. Some embodiments achieve that objective in the motion planner by using a smooth-drive function configured to maintain smoothness in the motion of the vehicle.

Other examples of driving objectives in the probabilistic motion planner can include increasing speed to speed limit 460 using a speed-limit function configured to maintain a speed of the vehicle at a speed limit, changing lane 470 using a change-lane function configured to change a current position of the vehicle from a current lane to a neighboring lane, and minimize idling at intersection 480 to reduce fuel consumption by using an intersection-crossing function configured to reduce an idle time of the vehicle at an intersection.

Some embodiments of the invention are based on the realization that the motion planner may have counteracting driving objectives. For example, it can be impossible to maintain a constant velocity 420 while keeping a safety margin 430 to surrounding obstacles. Some embodiments balance the counteracting driving objectives by making at least one of the control functions probabilistic.

Specifically, some embodiments are based on the realization that not all of the driving objectives can be fulfilled exactly. For example, the objective of speeding up to the speed limit 460 may sometimes be incompatible with the driving objective of maintaining a safety margin to surrounding obstacles 430. Also, a driver may from time to time decide a little bit differently what driving objectives are of most importance. Furthermore, for the case of a self-driving vehicle, there are additional uncertainties causing the driving objectives to be impossible to fulfill exactly. Hence, embodiments of the invention are based on the realization that there is an inexactness in achieving the driving objective, and the fulfillment degree of such driving objectives can vary from time to time.

Figure 4B:
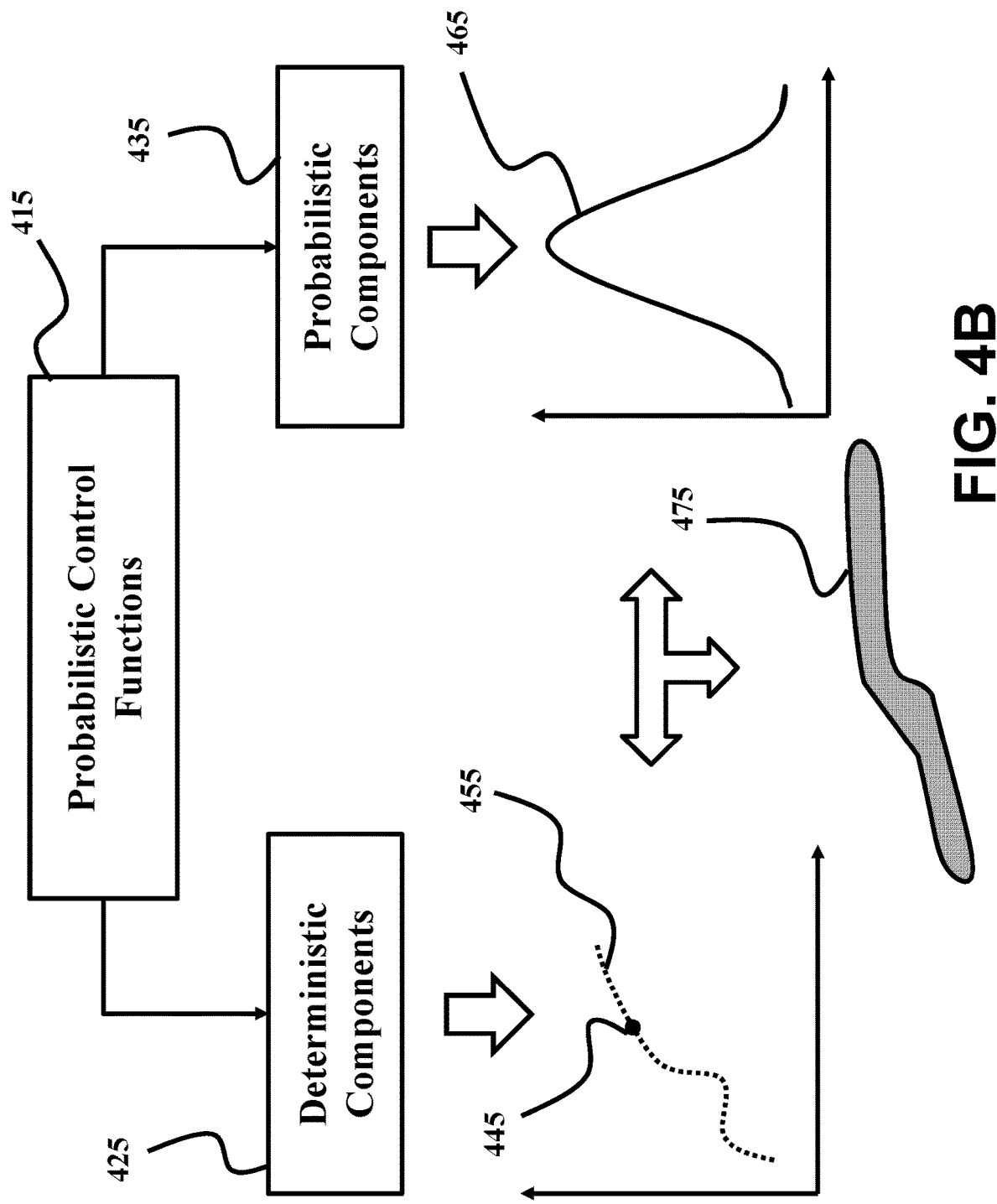
FIG. 4B shows a schematic of a structure of a probabilistic control function employed by the motion planner in some embodiments.

FIG. 4B shows a schematic of a structure of a probabilistic control function 415 employed by some embodiments of the motion planner. Each control function 415 is configured to transition the current state of the vehicle into a target state in a probabilistic manner based on its corresponding control objective. To that end, a probabilistic control function 415 includes a deterministic component 425 for transitioning the current state into the target state 455 and a probabilistic component 435 for determining a probabilistic distribution 465 of values around the target state determined by the deterministic component. The deterministic component can produce a single value 445 of the target state or a sequence of multiple values 455. Additionally, or alternatively, the deterministic component can be executed multiple times to produce the sequence 455. However, in some implementations, for each value 445 of the sequence of target states there is a probabilistic distribution 465, such that an output of the probabilistic control function is a parametric probability distribution 475 over the target state defined by a first moment and at least one higher order moment.

Figure 4C:
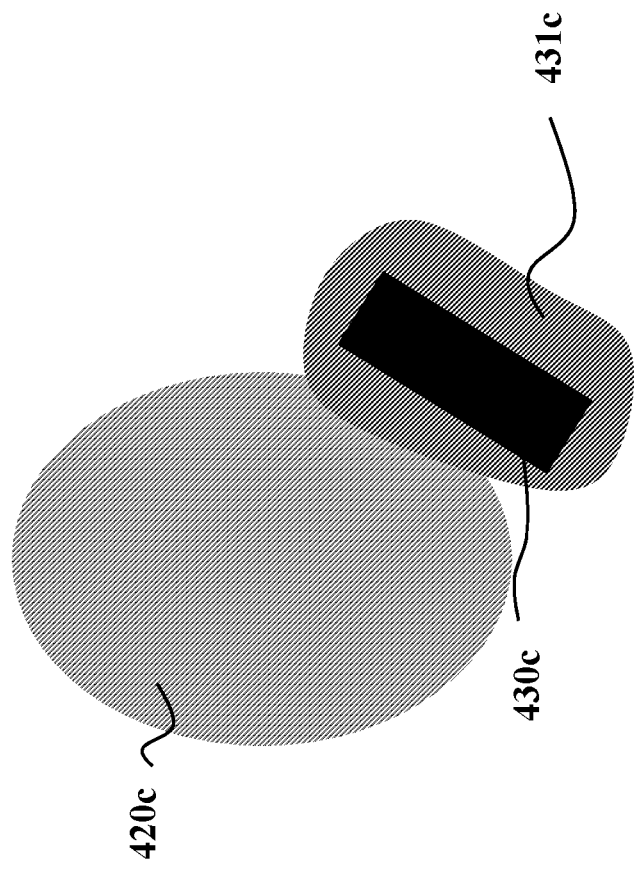
FIGS. 4C and 4D show examples of effects of the probabilistic output of a motion planner on performance of a vehicle controller according to some embodiments.
Figure 4C:
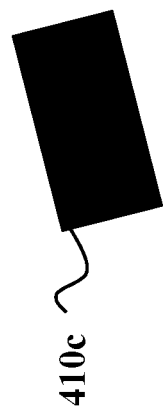

FIG. 4C shows an example of effect of the probabilistic output of a motion planner 310 on performance of a vehicle controller 320 according to some embodiments. In this example, FIG. 4C shows a current state of a vehicle 410c and a target state 420c that the vehicle aims to reach. The target state 420c can be a Cartesian position, a velocity, or another entity associated with the vehicle. The target state 420c can be a specific state, or a region of states. For example, the target state 420c can be an interval of allowed velocities or a region of possible locations in Cartesian space. A suitable control input is an input that takes the vehicle 410c from its initial state to target state 420c while achieving the driving objectives such as those in FIG. 4A, for example, a driving objective can be to stay within a region 431c on the road. The resulting state 430c from an input can correspond to a state transition resulting in applying a control input for one-time step, or the resulting state 430c can be connected with the initial state 410c with a trajectory 411c, that is, a sequence of state transitions.

The transition from the current state to the target state can be performed by testing a control input for a dynamic model of the motion of the vehicle in case of an autonomous or semi-autonomous vehicle. The model of the motion transitions the states of the vehicle according to a control input submitted to the model. In various embodiments, the mathematical model of the motion of the vehicle includes an uncertainty. To that end, the model of the motion of the vehicle is a probabilistic motion model in order to account for the fact that the model is a simplified description of the actual motion of the vehicle, but also to account for uncertainty in sensing of the true state of the vehicle, uncertainty in sensing of the state of obstacles, and uncertainty in sensing of the environment.

FIG. 4C shows the target state region 431c resulting from a particular choice of control inputs, wherein 431c is a nonzero probabilistic component and 430c is the deterministic component included in the region 431c. The driving objective region 420c is not overlapping with the target state region 431c, i.e., the region 431c does not include the driving objective region 420c. Hence, referring to FIG. 4C, the driving objective 420c is likely not to be fulfilled and the controller can alter its operations to better achieve one or multiple driving objectives.

Figure 4D:
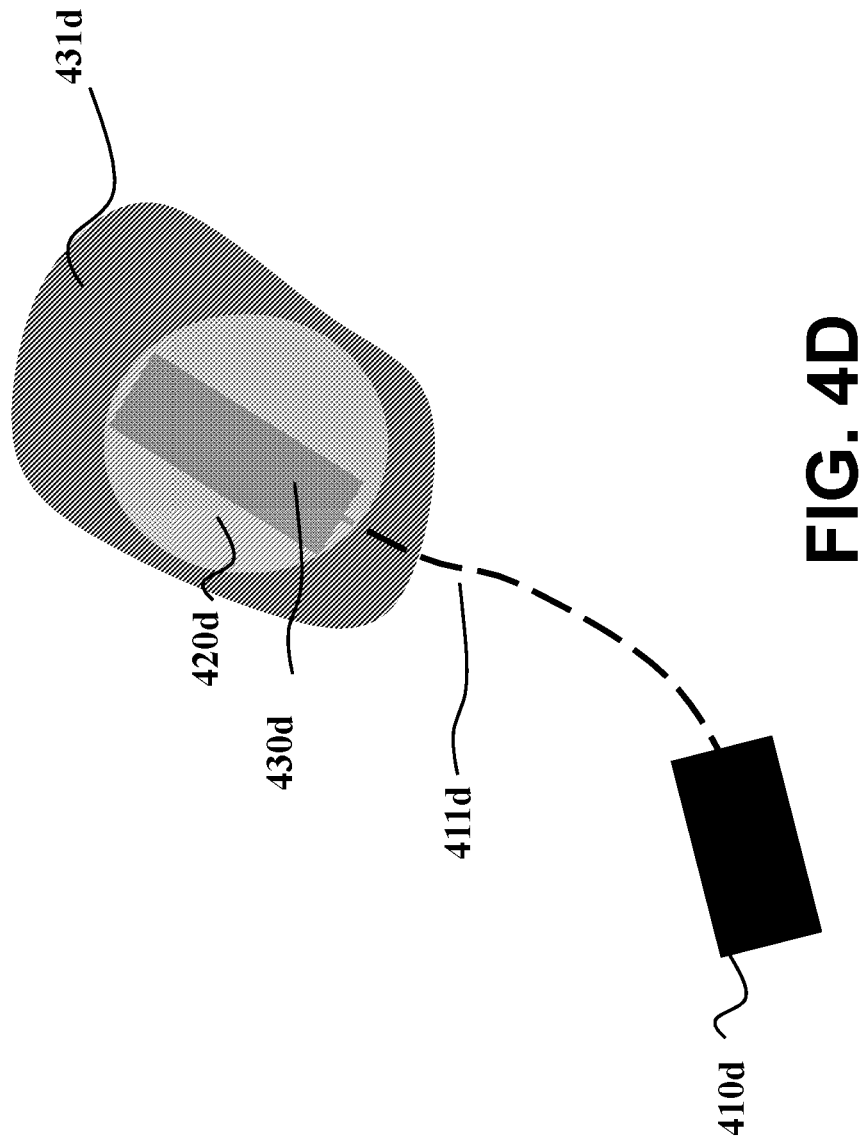

FIG. 4D shows the target state region 431d resulting from a particular choice of control inputs, wherein 431d is a nonzero probabilistic component and 430d is the deterministic component included in the region 431d. The driving objective region 420d is smaller than the target state region 431d and is entirely contained in 431d, i.e., the region 431d includes the region 420d. Hence, referring to FIG. 4D, the driving objective 420d is likely to be fulfilled by the choice of control inputs.

Figure 4E:
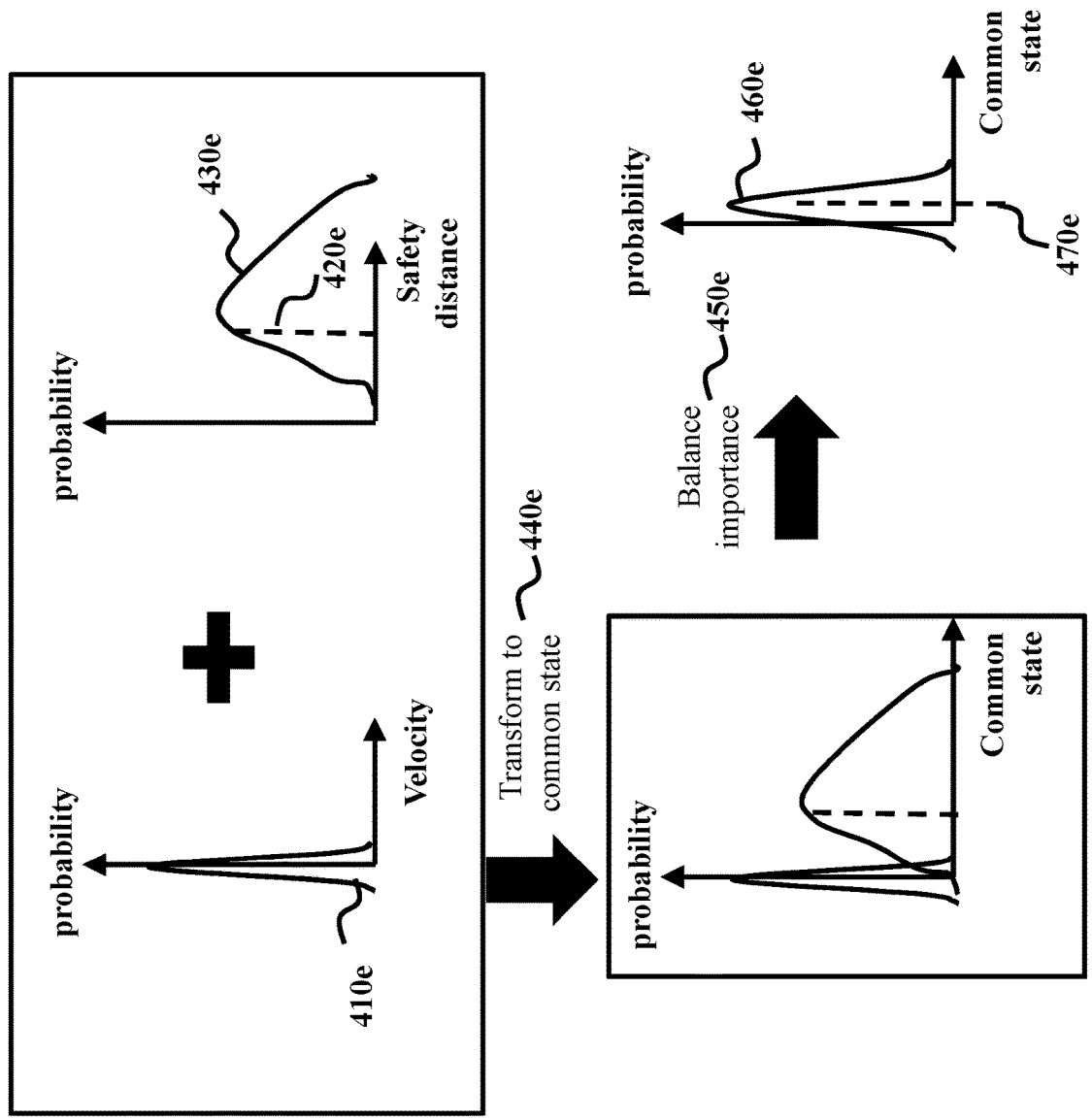
FIG. 4E shows an illustration of a method for how to balance the importance of different control functions according to some embodiments.

FIG. 4E shows an illustration of a method for how to balance the importance of different control functions according to some embodiments. FIG. 4E shows a situation where there are two driving objectives expressed as control functions, maintaining a nominal velocity 420 and maintaining a safety distance 430. The velocity requirement is expressed as a function of deviation of velocity from a nominal velocity and the safety distance is expressed as a Euclidean distance from the autonomous vehicle to an obstacle on the road. The deterministic component for the velocity control function is zero and the probabilistic component is a narrow shape 410e centered on the deterministic component. On the other hand, the safety distance requirement has a deterministic component 420e that is nonzero and a probabilistic component 430e that allows for a large variation around the deterministic component. Also, in this illustrative example the deterministic component 420e is not centered at the mean of the probabilistic component 430e. Since the velocity is not the same as distance, the velocity and safety distance control functions are transformed 440e to a common state, where the control functions can be compared. Then, the control functions are combined 450e into a joint distribution, which weights together the control functions. In some embodiments of the invention, a relative scaling of the different control objectives is used to combine and balance the relative importance of the control functions.

For example, in FIG. 4E the joint distribution balances 450e the importance into the common deterministic component 470e and the probabilistic component 460e, which both are closer to the respective components of the velocity control functions since the probability distribution of the velocity control function has a much smaller variation 410e than the probabilistic component 430e of the safety distance control function.

The joint distribution can be chosen in multiple ways. For instance, if the probabilistic components for each control function for each step in the sequence are Gaussian distributed, the joint distribution can be chosen as a multivariate Gaussian distribution, wherein the weighting of importance of each control function is weighted by the inverse of the covariance for each component.

The deterministic components can be chosen in multiple ways. For instance, one embodiment combines the deterministic components by stacking them in a vector such that they constitute a mean of the Gaussian distribution.

Even though the probabilistic component for each step in the sequence is Gaussian distributed, the sequence of distributions, especially when combined into a sequence of joint distributions, will be non-Gaussian. For instance, the deterministic component can be a nonlinear function mapping the current state to a control function output, which causes the sequence to be non-Gaussian distributed. To determine a sequence of combined states and distributions in such a case, numerical approximations can be used, e.g., by sampling.

Some embodiments of the invention are based on the realization that a similar balancing of the different control objectives can be used in the adaptive predictive controller that aims to track the reference motion that is computed by the probabilistic motion planner. For example, tracking of the different state variables can be combined into a joint tracking cost function, in which a weighting matrix is used to balance the importance of tracking one of the state variables relative to the importance of tracking one or multiple of the other state variables. In some embodiments of the invention, the weighting matrix is computed as a function of a scaling matrix and one or multiple higher order moments 217 of a sequence of parametric probability distributions over a sequence of target state and/or output values defining a motion command for the vehicle that is computed by the probabilistic motion planner 311. Some embodiments include a saturation function that bounds each of the weighting matrices between lower and upper bounds for the weighting of each of the control objectives in the joint cost function.

In addition to tracking the different state variables, some embodiments of the invention include one or multiple additional objective terms to be considered by the predictive controller. Examples of such additional terms can be related to driving comfort, speed limits, energy consumption, pollution, etc. These embodiments balance the cost of tracking the reference values of different state variables with these additional objective terms.

Figure 5A:
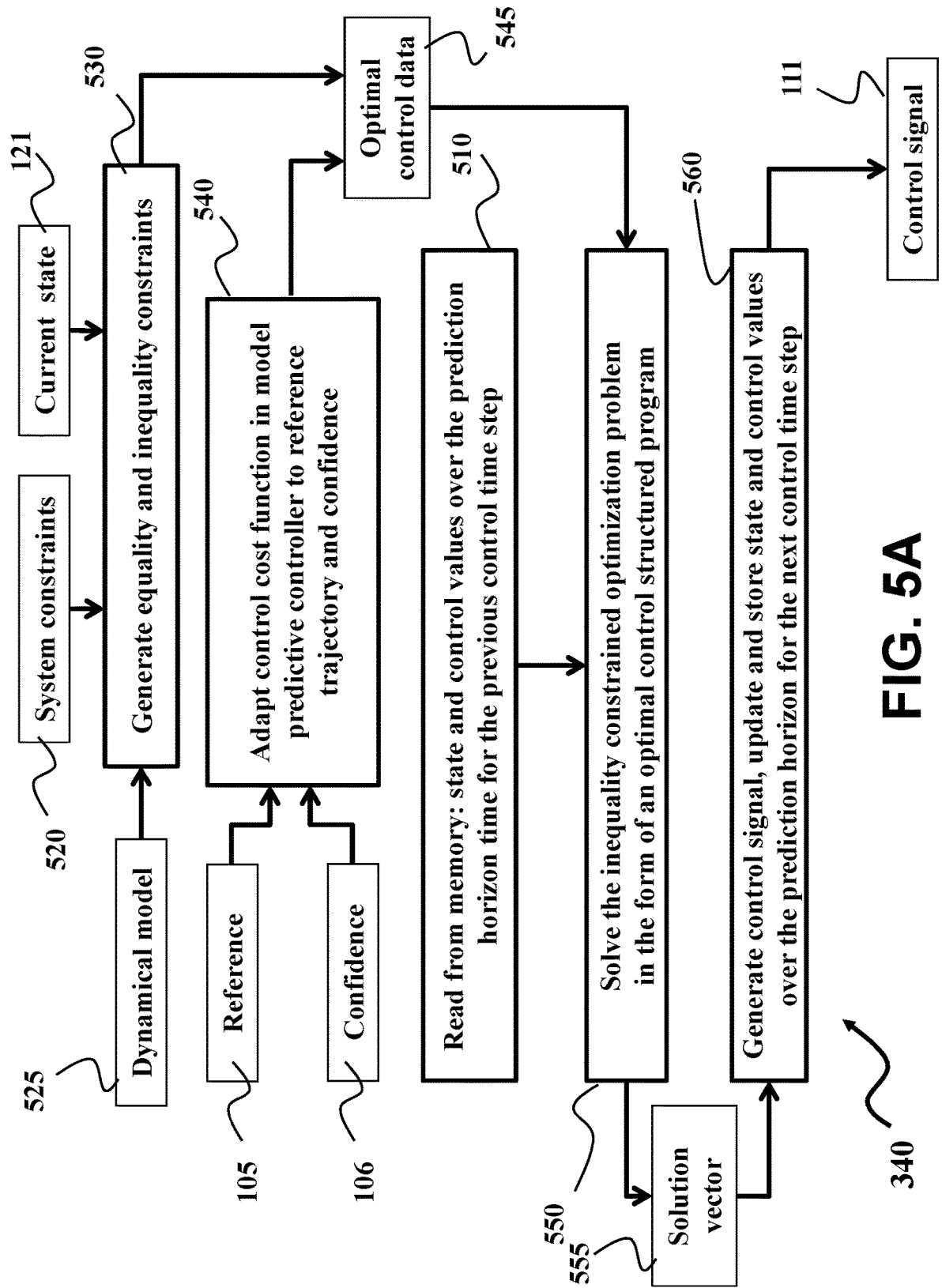
FIGS. 5A and 5B show a block diagram of an adaptive model predictive control (MPC) method that solves an inequality constrained optimization problem at each time step to implement the vehicle controller according to some embodiments.

FIG. 5A shows a block diagram of a system and a method for model predictive control (MPC) to implement the controller 110 that computes the control signal 111, given the current state of the system 121 and the control command 101 according to some embodiments. Specifically, MPC computes a control solution, e.g., a solution vector 555, that contains a sequence of future optimal control inputs over a prediction time horizon of the system 560, by solving an inequality constrained optimization problem in the form of an optimal control structured program 550 at each control time step. The optimal control data 545 of the objective function 540, equality and inequality constraints 530 in this optimization problem 550 depends on the dynamical model 525, the system constraints 520, the current state of the system 121 and the control command 101 that consists of the reference 105 and confidence 106.

In some embodiments, the solution of this inequality constrained optimization problem 550 uses the state and control values over the prediction time horizon from the previous control time step 510, which can be read from the memory. This concept is called warm- or hot-starting of the optimization algorithm and it can considerably reduce the required computational effort of the MPC controller in some embodiments. In a similar fashion, the corresponding solution vector 555 can be used to update and store a sequence of optimal or suboptimal state and control values for the next control time step 560.

Figure 5B:
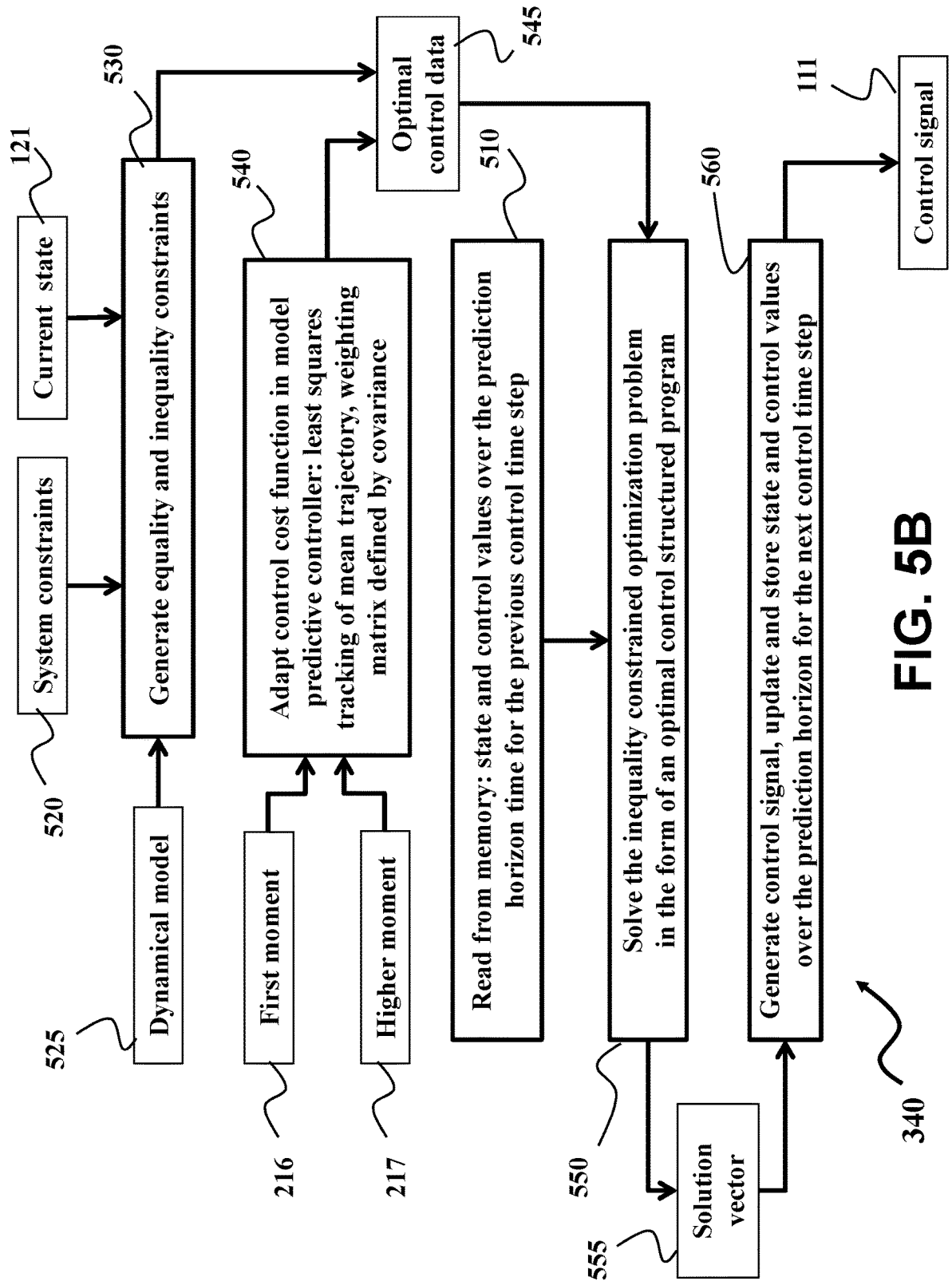

In some embodiments of the invention, the MPC controller 340 adapts one or multiple terms in the optimal control cost function 540 to the reference trajectory 105 and corresponding confidence bounds 106 that are computed by the probabilistic motion planner 311. As illustrated in FIG. 5B, a least squares type cost function can be used for tracking a reference trajectory with a particular weighting matrix. In some embodiments of the invention, the reference trajectory is defined by the first moment 216 and the weighting matrix is computed as a function of a covariance matrix 306 or a function of one or multiple higher order moments 217 of a sequence of parametric probability distributions over a sequence of target state and/or output values defining a motion command for the vehicle that is computed by the probabilistic motion planner 311.

Figure 6A:
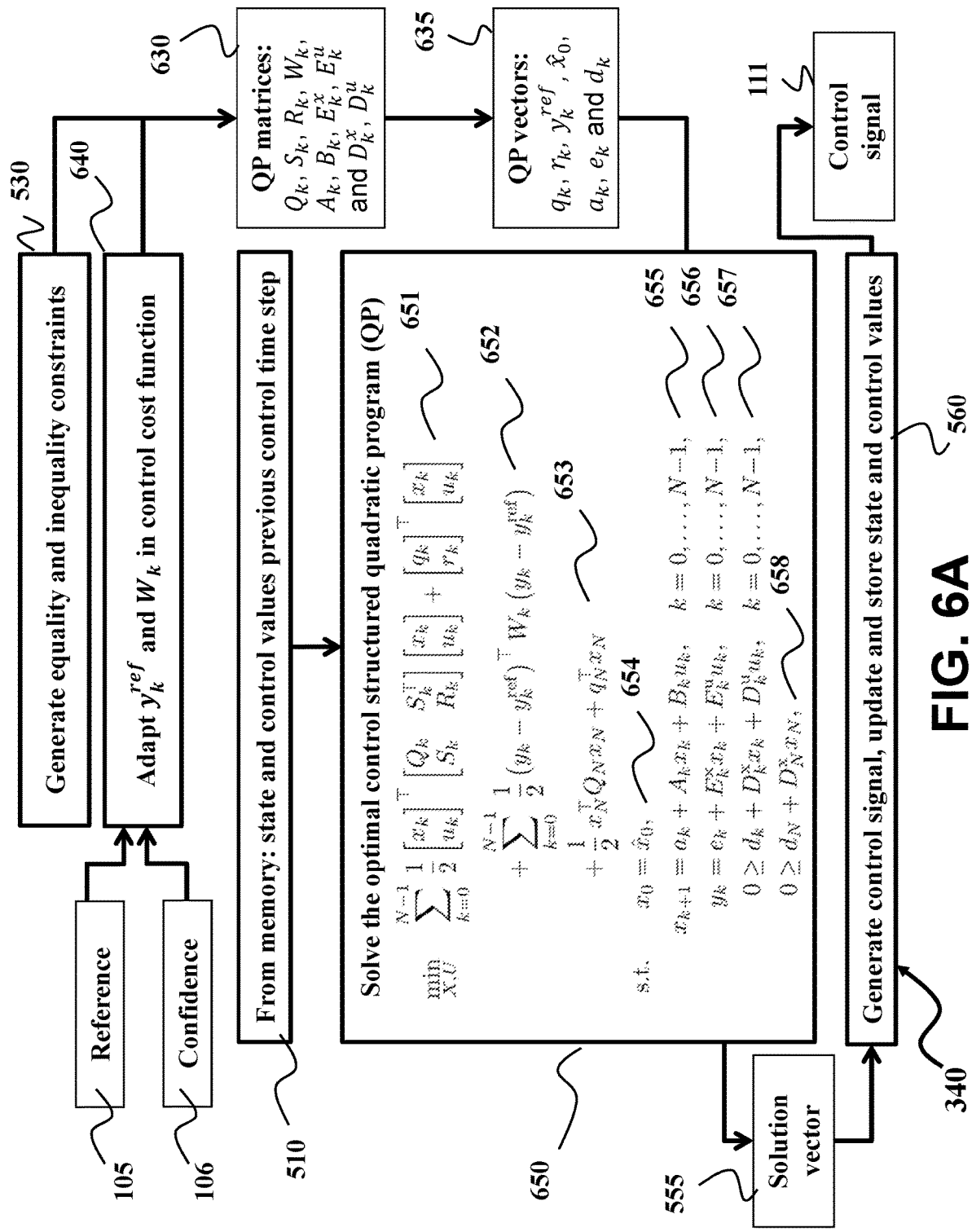
FIG. 6A is a block diagram of an adaptive MPC method that solves an optimal control structured quadratic program (QP) according to some embodiments.

FIG. 6A shows a block diagram of a system and a method for adaptive MPC 340 to implement the vehicle controller 110 according to some embodiments by solving an optimal control structured quadratic program (QP) 650 to compute the control signal 111, given the current state of the system 121 and the control command 101. In some embodiments of the invention, the adaptive MPC controller uses a linear-quadratic objective function in combination with a linear dynamical model to predict the behavior of the vehicle and linear inequality constraints, resulting in an optimal control structured QP problem formulation that could read as $$\min_{X,U} \sum_{k=0}^{N-1} \frac{1}{2} \begin{bmatrix} x_k \\ u_k \end{bmatrix}^\top \begin{bmatrix} Q_k & S_k^\top \\ S_k & R_k \end{bmatrix} \begin{bmatrix} x_k \\ u_k \end{bmatrix} + \begin{bmatrix} q_k \\ r_k \end{bmatrix}^\top \begin{bmatrix} x_k \\ u_k \end{bmatrix} +$$

$$\sum_{k=0}^{N-1} \frac{1}{2} (y_k - y_k^{ref})^\top W_k (y_k - y_k^{ref}) + \frac{1}{2} x_N^\top Q_N x_N + q_N^\top x_N$$

s.t. $x_0 = \hat{x}_0$, $x_{k+1} = a_k + A_k x_k + B_k u_k, \quad k = 0, \ldots, N-1,$ $y_k = e_k + E_k^x x_k + E_k^u u_k, \quad k = 0, \ldots, N-1,$ $0 \geq d_k + D_k^x x_k + D_k^u u_k, \quad k = 0, \ldots, N-1,$ $0 \geq d_N + D_N^x x_N,$ where the prediction horizon of the adaptive linear MPC controller is discretized in time, using a sequence of N equidistant or non-equidistant control intervals that are divided by a corresponding sequence of discrete time points $t_k$ for $k=0, \ldots, N$. The optimization variables in the optimal control structured QP 650 consist of state variables $x_k$ and control input variables $u_k$ for k=0, . . . , N. In some embodiments of the invention, the dimensions for the state and control variables do not need to be equal to each other for each discrete time point $t_k$ for k=0, . . . , N. At each sampling time for the adaptive MPC controller, the optimal control structured QP 650 is formulated, using QP matrices 630 and QP vectors 635, and subsequently the QP is solved in order to compute the solution vector 555 to update the state and control trajectory 560 and generate a new control signal 111.

The objective function in the constrained QP 650 that is solved by the adaptive MPC controller 340 includes one or multiple least squares reference tracking terms 652, which penalize the difference between a sequence of predicted state and/or output values 656 and a sequence of reference state and/or output values 105 that is computed by the motion planner. The reference state and/or output values 105 define the first moment 316 of the probabilistic distributions.

In some embodiments of the invention, a sequence of weighting matrices $W_k$ is used in the least squares reference tracking terms 652 for k=0, . . . , N, and each weighting matrix $W_k$ is adapted in the control cost function 640 based on the reference 105 and confidence 106 that is computed by the probabilistic motion planner at each sampling instant. The weighting matrix $W_k$ is computed as a function of or is represented by the higher moments 317 of the probabilistic distributions.

The output variables $y_k$ for k=0, . . . , N, which are used in the reference tracking objective term 652, can be defined as any linear function of state and/or control input variables 656. For example, the output function could include one or multiple combinations of one or multiple of longitudinal or lateral velocities and/or accelerations of the vehicle, a slip ratio or slip angle, angles of orientation or angular velocities, wheel speeds, forces and/or torques. The reference tracking objective term 652 is defined by the weighting matrix $W_k$ in the QP matrices 630 and the reference values $y_k^{ref}$ in the QP vectors 635. In some embodiments of the invention, the weighting matrix is either positive definite $W_k \succ 0$ or positive semi-definite $W_k \succeq 0$, i.e., all eigenvalues of the matrix $W_k$ are either larger than zero or all eigenvalues of the matrix $W_k$ are larger than or equal to zero.

In various embodiments, the penalty between the reference values determined by the motion planner and the values determined by the predictive controller is weighted by the weighting matrix that assigns different weights to different states variables of the target states. Additionally, or alternatively, some embodiments add additional objective terms to be considered by the predictive controller. Examples of such additional terms can be related to driving comfort, speed limits, energy consumption, pollution, etc. These embodiments balance the cost of reference tracking with these additional objective terms.

For example, some embodiments define additional objective terms for the MPC cost function in the form of a linear-quadratic stage cost 651 and/or a linear-quadratic terminal cost term 653. These additional linear-quadratic objective terms, including the stage cost 651 and terminal cost 653, can include a linear and/or quadratic penalization of one or multiple combinations of one or multiple state and/or control input variables. For example, the objective function in the constrained QP 650 could include a linear or quadratic penalization of longitudinal or lateral velocities and/or accelerations of the vehicle, a slip ratio or slip angle, angles of orientation or angular velocities, wheel speeds, forces, torques or any combination of such quantities. The linear-quadratic objective terms in the stage cost 651 and the terminal cost 653 are defined by the matrices $Q_k$, $S_k$ and $R_k$ in the QP matrices 630 and the gradient values $q_k$, $r_k$ in the QP vectors 635. In some embodiments of the invention, the Hessian matrix $$H_k = \begin{bmatrix} Q_k & S_k^T \\ S_k & R_k \end{bmatrix}$$

is either positive definite $H_k \succ 0$ or positive semi-definite $H_k \succeq 0$, i.e., all eigenvalues of the Hessian matrix $H_k$ are either larger than zero or all eigenvalues of the matrix $H_k$ are larger than or equal to zero.

The constrained optimal control structured QP 650 that is solved by the adaptive linear MPC controller 340 defines a linear dynamical model 655 that describes the state of the vehicle at one time step $t_{k+i}$, given the state and control variables at the previous time step $t_k$. The linear dynamical model is defined by a time-invariant or time-varying sequence of matrices $A_k$ and $B_k$ in the QP matrices 630 and vectors $a_k$ in the QP vectors 635 for k=0, . . . , N−1. Given the current state estimate $\hat{x}_0$ 121 in the equality constraint for the initial state value 654 and a sequence of control input values $u_k$, the linear dynamical model equations 655 can be used to compute the state values $x_k$ for k=0, . . . , N.

In addition to the equality constraints, including the initial value condition 654, the dynamic equations 655 and output equations 656, the constrained optimal control structured QP 650 can include one or multiple inequality constraints to impose physical limitations of the system, safety constraints and/or to impose desirable performance-related constraints on the behavior of the autonomous or semi-autonomous vehicle. More specifically, the QP can include path inequality constraints 657 for k=0, . . . , N−1 and/or terminal inequality constraints 658 at the end of the prediction horizon. The inequality constraints are defined by a time-invariant or time-varying sequence of matrices $D_k^x$ and $D_k^u$ in the QP matrices 630 and vectors $d_k$ in the QP vectors 635 for k=0, . . . , N.

The inequality constraints could include constraints on one or multiple combinations of one or multiple of longitudinal or lateral velocities and/or accelerations of the vehicle, the position and/or orientation of the vehicle with respect to its surroundings, a slip ratio or slip angle, angles of orientation or angular velocities, wheel speeds, forces and/or torques. For example, obstacle avoidance constraints could be implemented in the adaptive MPC controller by defining a set of one or multiple inequality constraints on a linear function of the predicted position, velocity and orientation of the vehicle with respect to the predicted position, velocity and orientation of one or multiple obstacles in the surrounding environment of the vehicle.

Some embodiments of the invention are based on the realization that the optimal control structured QP 650 is convex if the Hessian matrix $H_k$ 651, the terminal cost matrix $Q_N$ 653 and the weighting matrix $W_k$ 652 are positive definite or positive semi-definite. Embodiments of the invention can use an iterative optimization algorithm to solve the optimal control structured QP 650 to find the solution vector 555, which is either feasible with respect to the constraints and globally optimal, feasible but suboptimal or an algorithm could find a low-precision approximate control solution that is neither feasible nor optimal. As part of the adaptive MPC controller, the optimization algorithm can be implemented in hardware or as a software program executed in a processor.

Examples of iterative optimization algorithms for solving the QP 650 include primal or dual gradient-based methods, projected or proximal gradient methods, forward-backward splitting methods, alternating direction method of multipliers, primal, dual or primal-dual active-set methods, primal or primal-dual interior point methods or variants of such optimization algorithms. In some embodiments of the invention, the block-sparse optimal control structure in the QP matrices 630 can be exploited in one or multiple of the linear algebra operations of the optimization algorithm in order to reduce the computational complexity and therefore to reduce the execution time and memory footprint of the QP optimization algorithm.

Other embodiments of the invention can solve a non-convex optimal control structured QP 650 using optimization algorithms for nonlinear programming such as, for example, sequential quadratic programming (SQP) or interior point methods (IPM) that may either find a suboptimal, locally optimal or globally optimal control solution to the inequality constrained optimization problem at each sampling time of the adaptive MPC controller 340.

Figure 6B:
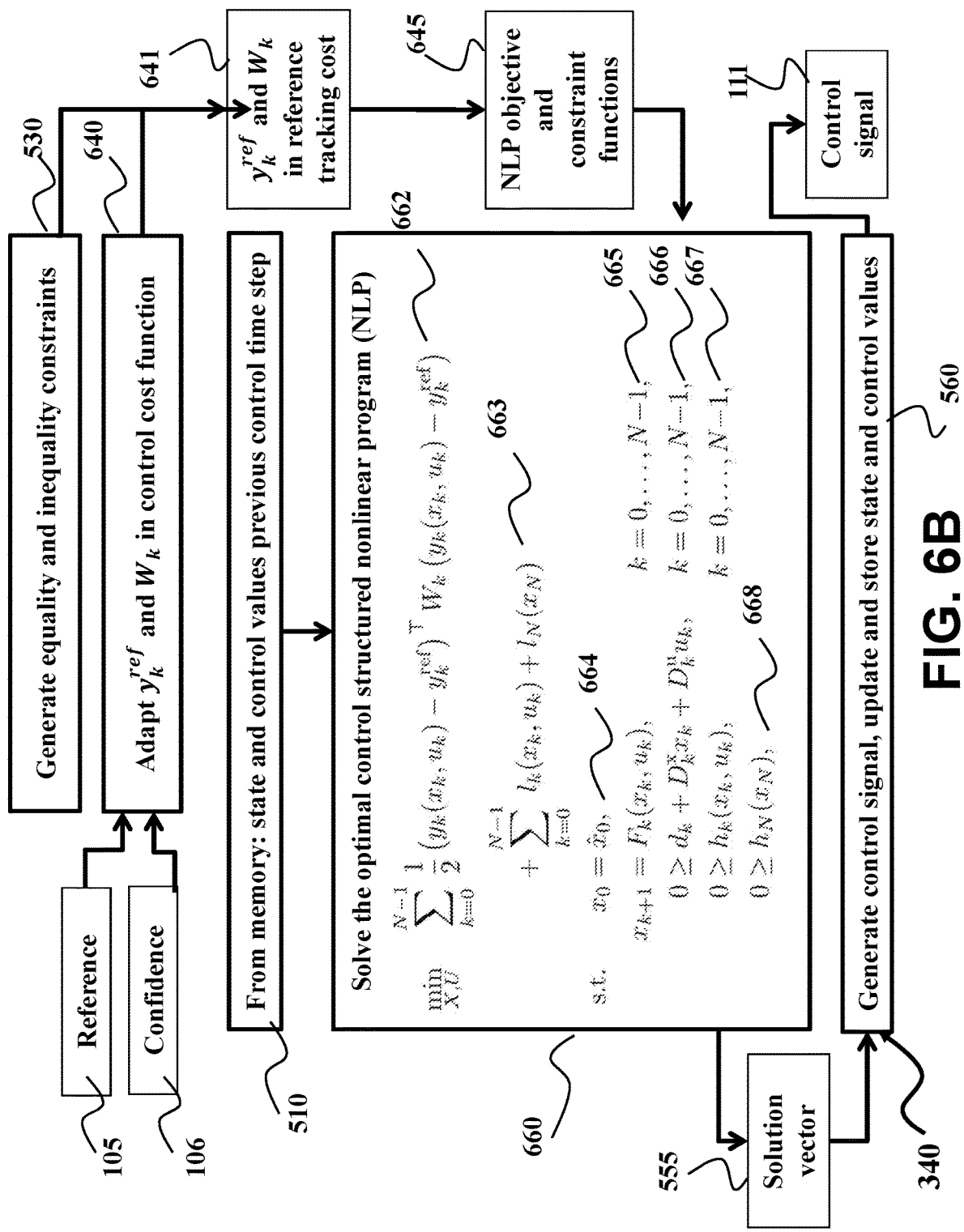
FIG. 6B is a block diagram of an adaptive MPC method that solves an optimal control structured nonlinear program (NLP) according to some embodiments.

FIG. 6B shows a block diagram of a system and a method for adaptive MPC 340 to implement the vehicle controller 110 by solving an optimal control structured nonlinear program (NLP) 660 to compute the control signal 111, given the current state of the system 121 and the control command 101. In some embodiments of the invention, the adaptive MPC controller uses a linear-quadratic or nonlinear objective function in combination with a linear or nonlinear dynamical model to predict the behavior of the vehicle and a combination of linear and nonlinear inequality constraints, resulting in an optimal control structured NLP problem formulation that could read as $$\min_{X,U} \sum_{k=0}^{N-1} \frac{1}{2}\left(y_k(x_k, u_k) - y_k^{ref}\right)^\top W_k\left(y_k(x_k, u_k) - y_k^{ref}\right) + \sum_{k=0}^{N-1} l_k(x_k, u_k) + l_N(x_N)$$

$$\text{s.t.} \quad x_0 = \hat{x}_0,$$

$$x_{k+1} = F_k(x_k, u_k) \quad k = 0, \ldots, N-1,$$

$$0 \geq d_k + D_k^x x_k + D_k^u u_k, \quad k = 0, \ldots, N-1,$$

$$0 \geq h_k(x_k, u_k) \quad k = 0, \ldots, N-1,$$

$$0 \geq h_N(x_N),$$

where the prediction horizon of the adaptive nonlinear MPC controller is discretized in time, using a sequence of N equidistant or non-equidistant control intervals that are divided by a sequence of discrete time points $t_k$ for k=0, ..., N. The optimization variables in the optimal control structured NLP 660 consist of state variables $x_k$ and control input variables $u_k$ for k=0, ..., N. In some embodiments of the invention, the dimensions for the state and control variables do not need to be equal to each other for each discrete time point $t_k$ for k=0, ..., N. At each sampling time for the adaptive MPC controller, the optimal control structured NLP 660 is formulated, using the reference and weighting matrix in the reference tracking cost 641 and NLP objective and constraint functions 645, and the NLP is solved in order to compute the solution vector 555 to update the state and control trajectory 560 and generate a new control signal 111.

The objective function in the constrained NLP 660 that is solved by the adaptive MPC controller 340 includes one or multiple linear and/or nonlinear least squares reference tracking terms 662, which penalize the difference between a sequence of predicted state and/or output values and a sequence of reference state and/or output values 105 that is computed by the motion planner. In some embodiments of the invention, a sequence of weighting matrices $W_k$ is used in the least squares reference tracking terms 662 for k=0, ..., N, and each weighting matrix $W_k$ is adapted in the control cost function 640 based on the reference 105 and confidence 106 that is computed by the probabilistic motion planner at each sampling instant. The output values $y_k$ ($x_k$, $u_k$) for k=0, ..., N, which are used in the reference tracking objective term 662, can be defined as any linear or nonlinear function of state and/or control input variables. For example, the output function could include one or multiple combinations of one or multiple of longitudinal or lateral velocities and/or accelerations of the vehicle, a slip ratio or slip angle, angles of orientation or angular velocities, wheel speeds, forces and/or torques. The reference tracking objective term 662 is defined by the weighting matrix $W_k$ and the reference values $y_k^{ref}$ 641. In some embodiments of the invention, the weighting matrix is either positive definite $W_k \succ 0$ or positive semi-definite $W_k \succeq 0$, i.e., all eigenvalues of the matrix $W_k$ are either larger than zero or all eigenvalues of the matrix $W_k$ are larger than or equal to zero.

Embodiments of the invention can define additional objective terms for the MPC cost function in the form of a stage cost and/or a terminal cost term 663, which can both consist of any combination of linear, linear-quadratic or nonlinear functions. These additional objective terms can include a penalization of one or multiple combinations of one or multiple linear or nonlinear functions of state and/or control input variables. For example, the objective function 645 in the constrained NLP 660 could include a linear, quadratic or nonlinear penalization of longitudinal or lateral velocities and/or accelerations of the vehicle, a slip ratio or slip angle, angles of orientation or angular velocities, wheel speeds, forces, torques or any combination of such quantities.

The constrained optimal control structured NLP 660 that is solved by the adaptive nonlinear MPC controller 340 can define a nonlinear dynamical model 665 that describes the state of the vehicle at one time step $t_{k+i}$, given the state and control variables at the previous time step $t_k$. The nonlinear dynamical model is defined by a time-invariant or time-varying function $x_{k+i}=F_k$ ($x_k$, $u_k$) for k=0, ..., N-1. Given the current state estimate $\hat{x}_0$ 121 in the equality constraint for the initial state value 664 and a sequence of control input values $u_k$, the nonlinear dynamical model equations 665 can be used to compute the state values $x_k$ for k=0, ..., N.

Some embodiments of the invention are based on the realization that a discrete-time dynamical model 665 to predict the behavior of the vehicle can be obtained by performing a time discretization of a set of continuous time differential or differential-algebraic equations. Such a time discretization can sometimes be performed analytically but generally requires the use of a numerical simulation routine to compute a numerical approximation of the discrete-time evolution of the state trajectory. Examples of numerical routines to approximately simulate a set of continuous time differential or differential-algebraic equations include explicit or implicit Runge-Kutta methods, explicit or implicit Euler, backward differentiation formulas and other single- or multistep methods.

In addition to the equality constraints, including the initial value condition 664 and the dynamic equations 665, the constrained optimal control structured NLP 660 can include one or multiple linear and/or nonlinear inequality constraints to impose physical limitations of the system, safety constraints and/or to impose desirable performance-related constraints on the behavior of the autonomous or semi-autonomous vehicle. More specifically, the NLP can include linear path inequality constraints 666 or nonlinear path inequality constraints 667 for k=0, . . . , N−1 as well as linear and/or nonlinear terminal inequality constraints 668 imposed at the end of the prediction horizon. The inequality constraints are defined by a time-invariant or time-varying sequence of matrices $D_k^x$, $D_k^u$, vectors $d_k$ and/or nonlinear functions $h_k(x_k, u_k)$ for k=0, . . . , N.

The inequality constraints could include constraints on one or multiple combinations of one or multiple of longitudinal or lateral velocities and/or accelerations of the vehicle, the position and/or orientation of the vehicle with respect to its surroundings, a slip ratio or slip angle, angles of orientation or angular velocities, wheel speeds, forces and/or torques. For example, obstacle avoidance constraints could be implemented in the adaptive nonlinear MPC controller by defining a set of one or multiple inequality constraints on a linear or nonlinear function of the predicted position, velocity and orientation of the vehicle with respect to the predicted position, velocity and orientation of one or multiple obstacles in the surrounding environment of the vehicle.

In some embodiments of the invention, the adaptive nonlinear MPC controller includes obstacle avoidance constraints that are implemented using a time-varying sequence of one or multiple ellipsoidal inequality constraints that could read as $$1 \le \left(\frac{\delta_{x,j}(t)}{a_{x,j}}\right)^2 + \left(\frac{\delta_{y,j}(t)}{a_{y,j}}\right)^2$$

where $$\begin{bmatrix} \delta_{x,j} \\ \delta_{y,j} \end{bmatrix} = R(e_{\psi,j})^T \begin{bmatrix} p_X - e_{x,j} \\ p_Y - e_{y,j} \end{bmatrix}$$

is the rotated distance of the estimated or predicted vehicle position $(p_X, p_Y)$ to the estimated and/or predicted position of one of potentially multiple obstacles in the surrounding environment of the vehicle. The position and orientation of each obstacle is denoted by $(e_{x,j}, e_{y,j}, e_{\psi,j})$, the matrix $R(e_{\psi,j})^T$ denotes the transpose of the rotation matrix corresponding to the angle $e_{\psi,j}$ that represents the orientation of the obstacle, and $(a_{x,j}, a_{y,j})$ denotes the lengths of the principal semi-axes of the ellipsoid that defines the safety margin, including uncertainty around the spatial extent of the estimated shape, around each of the M nearest detected obstacles for j=1, . . . , M. The real-time obstacle detection and corresponding pose estimation can be performed by a sensing module and this information is shared by the different components in the multi-layer vehicle control architecture.

Some embodiments of the invention are based on tailored optimization algorithms to efficiently solve the constrained optimal control structured NLP 660 at each sampling instant of the nonlinear adaptive MPC controller. Such an optimization algorithm can find a solution vector 555, which is either feasible with respect to the constraints and globally optimal, feasible but locally optimal, feasible but suboptimal or an iterative optimization algorithm could find a low-precision approximate control solution that is neither feasible nor locally optimal. Examples of NLP optimization algorithms include variants of interior point methods and variants of sequential quadratic programming (SQP) methods.

In particular, some embodiments of the invention use the real-time iteration (RTI) algorithm that is an online variant of sequential quadratic programming in combination with a quasi-Newton or generalized Gauss-Newton type positive semi-definite Hessian approximation such that at least one convex block-sparse QP approximation needs to be solved at each sampling instant of the nonlinear MPC controller. Each RTI iteration consists of two steps:

(1) Preparation phase: discretize and linearize the system dynamics, linearize the remaining constraint functions, and evaluate the quadratic objective approximation to build the optimal control structured QP subproblem.

(2) Feedback phase: solve the QP to update the current values for all optimization variables and obtain the next control input to apply feedback to the system.

In some embodiments of the invention, the block-sparse optimal control structure in the Hessian and constraint Jacobian matrices can be exploited in one or multiple of the linear algebra operations of the optimization algorithm in order to reduce the computational complexity and therefore to reduce the execution time and memory footprint of the NLP optimization algorithm.

Figure 7A:
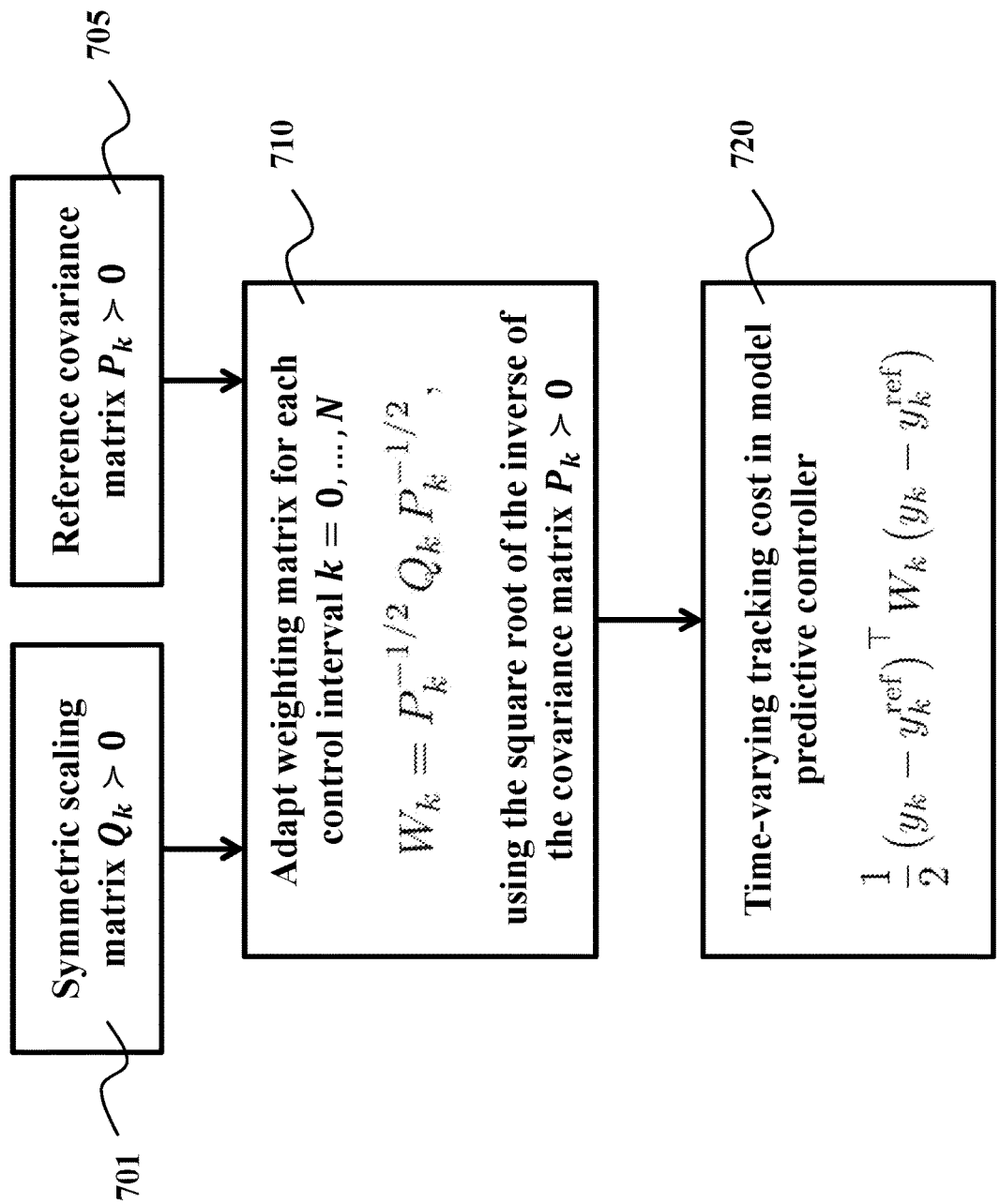
FIG. 7A is a block diagram of a method to adapt the reference and weighting matrix for a particular embodiment of the time-varying reference tracking cost in the adaptive linear or nonlinear MPC controller.

FIG. 7A shows a block diagram of a method to adapt the reference and weighting matrix 640 in a particular embodiment of the time-varying reference tracking cost 720 in the adaptive linear or nonlinear MPC controller 340. The MPC tracking cost 720 is weighted with time-varying positive definite or positive semi-definite weighting matrices 710 and each of the weighting matrices is computed based on an inverse proportional relation to the time-varying uncertainty around the reference that is computed by the probabilistic motion planner, represented by a combination of one or multiple of the higher order moments 317 of the parametric probability distributions.

In some embodiments of the invention, the MPC uses time-varying positive definite or positive semi-definite weighting matrices in the tracking cost that are computed as a stage-wise scaled inverse of the sequence of covariance matrices 705 of the parametric probability distributions from the probabilistic motion planner. The sequence of covariance matrices 705 represent or include high order moments of the probabilistic distributions determined by the motion planner. The motion planner weights the different control objectives in relation to their respective importance, to produce a suitable sequence of state and/or output values and probability distributions for the MPC to control the vehicle. Given a covariance matrix $P_k \succ 0$ corresponding to each reference state and/or output value, the weighting matrix in the adaptive linear or nonlinear MPC controller could be computed as follows $$W_k = P_k^{-1/2} Q_k P_k^{-1/2},$$

where $W_k$ denotes the weighting matrix in the MPC reference tracking cost 720, the matrix $P_k$ denotes the covariance matrix 705 and $Q_k \succ 0$ is a symmetric and positive definite scaling matrix 701. The scaling matrix $Q_k$ can be chosen as a time-invariant or a time-varying sequence of symmetric and positive definite matrices, in which each scaling matrix is either a dense or diagonal matrix. In some embodiments of the invention, the scaling matrix is chosen in accordance with the relative scaling of the different control objectives by the probabilistic motion planner in relation to their respective importance.

In FIG. 7A, the weighting matrix for each control interval k=0, . . . , N is computed using the square root of the inverse of the covariance matrix $P_k^{-1/2}$. In some embodiments of the invention, the weighting matrix in the adaptive linear or nonlinear MPC controller could alternatively be computed as follows $$W_k = L_k^{-T} Q_k L_k^{-1}$$

where $L_k$ denotes the Cholesky factor of the positive definite covariance matrix $P_k \succ 0$ such that $P_k = L_k L_k^T$ and $P_k^{-1} = L_k^{-T} L_k^{-1}$. Some embodiments are based on the realization that the weighting matrix $W_k = L_k^{-T} Q_k L_k^{-1}$ can be computed efficiently based on a Cholesky factorization of the positive definite covariance matrix $P_k = L_k L_k^T$ and a Cholesky factorization of the positive definite scaling matrix $Q_k = R_k^T$, such that the intermediate matrix $X_k = L_k^{-T} R_k$ can be computed efficiently using forward or backward substitutions and the symmetric weighting matrix can be computed subsequently as $W_k = X_k X_k^T$.

Figure 7B:
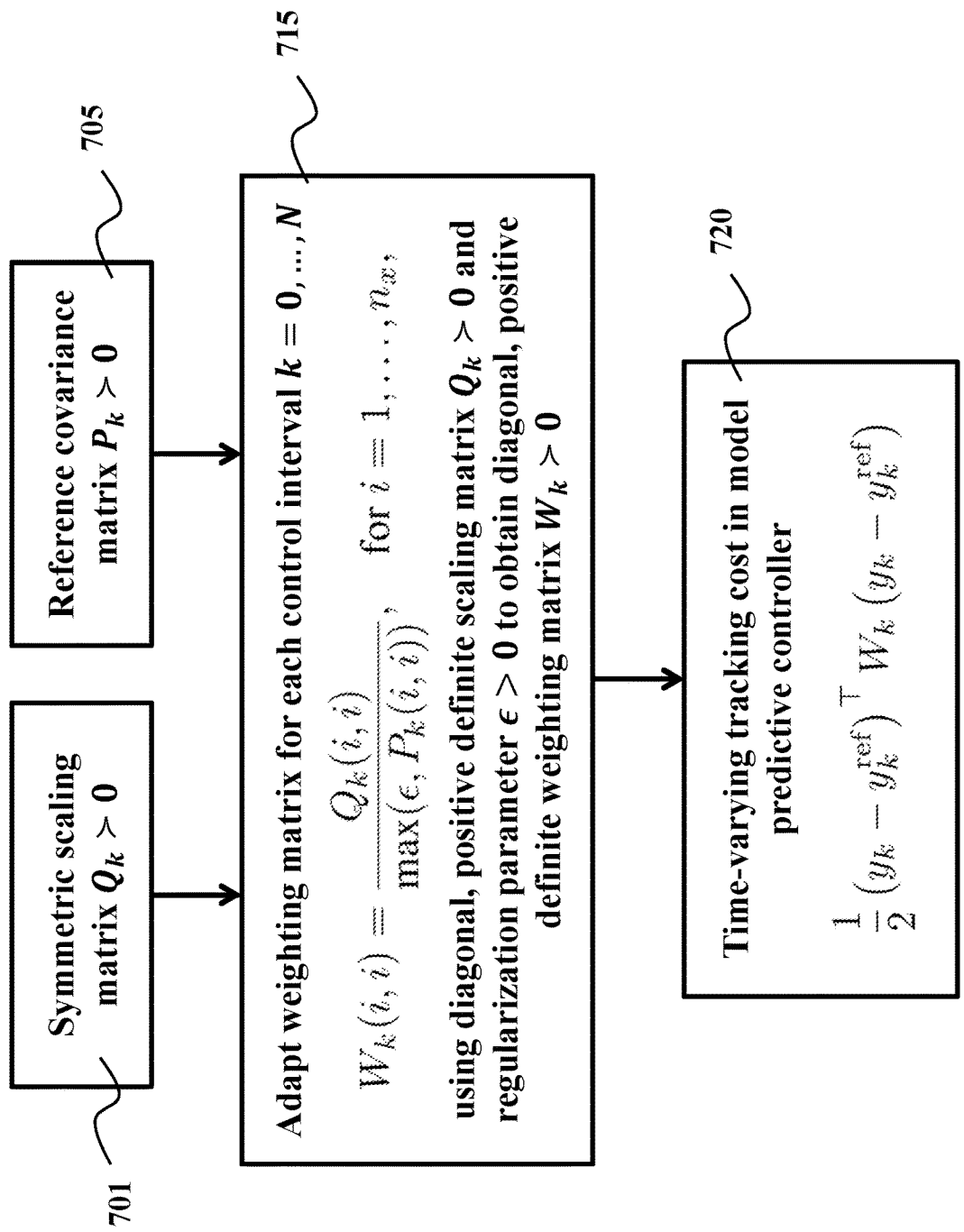
FIG. 7B is a block diagram of a method to adapt the reference and diagonal weighting matrix for a particular embodiment of the time-varying reference tracking cost in the adaptive linear or nonlinear MPC controller.

FIG. 7B shows a block diagram of a method to adapt the reference and weighting matrix 640 in a particular embodiment of the time-varying reference tracking cost 720 in the adaptive linear or nonlinear MPC controller 340, based on a diagonal positive definite weighting matrix $W_k \succ 0$ 715 where each of the diagonal entries can be computed individually $$W_k(i, i) = \frac{Q_k(i, i)}{\max(\epsilon, P_k(i, i))}, \text{ for } i = 1, \ldots, n_x,$$

using only the corresponding diagonal entries of the positive definite scaling matrix $Q_k \succ 0$ 701 and the corresponding diagonal entries of each reference covariance matrix $P_k \succ 0$ 705. In some embodiments of the invention, one or multiple saturation functions can be used to improve the numerical conditioning of the constrained optimization problem that is solved by the MPC, for example, based on a regularization parameter $\epsilon > 0$ in order to be able to provide lower and upper bounds for each of the time-varying positive-definite weighting matrices in the reference tracking cost of the adaptive MPC controller. Such a representation of weighting matrices as diagonal matrices is computationally cheaper.

FIG. 7C shows an algorithm description for the automatic tuning of the time-varying reference tracking cost of the adaptive MPC controller 540, using higher order moments from the probabilistic motion planner. Based on the sequence of reference state and/or output values and corresponding covariance matrices 740, a smooth approximation of the reference motion 743 can be used in the least squares type objective term of the MPC controller and each of the weighting matrices can be computed individually based on an inverse proportional relation with each of the corresponding covariance matrices 730 from the probabilistic motion planner, which is repeated at each sampling instant of the MPC controller 744. If a new reference motion plan is computed 741 by the probabilistic motion planner, consisting of first 316 and higher order moments 317 of the parametric probability distributions, the sequence of reference state and/or output values and corresponding covariance matrices can be reset 742. If a new reference motion plan is not yet available, the most up to date sequence of reference state and/or output values and corresponding covariance matrices can be shifted from one control time step to the next.

Some embodiments of the invention are based on the realization that the motion planner acts on a longer time scale than the MPC, while the MPC controller can execute at a higher sampling rate than the motion planner, such that the MPC can adjust more quickly to environmental changes and to uncertainties in the sensing and estimation of the vehicle state as well as of the surroundings of the vehicle, compared to the relatively low reactivity of the motion planner.

In some embodiments of the invention, the computation of the sequence of combined states and probability distributions in the probabilistic motion planner is implemented as a tree that expands until a sequence of states reaching the driving decision has been found.

Figure 8:
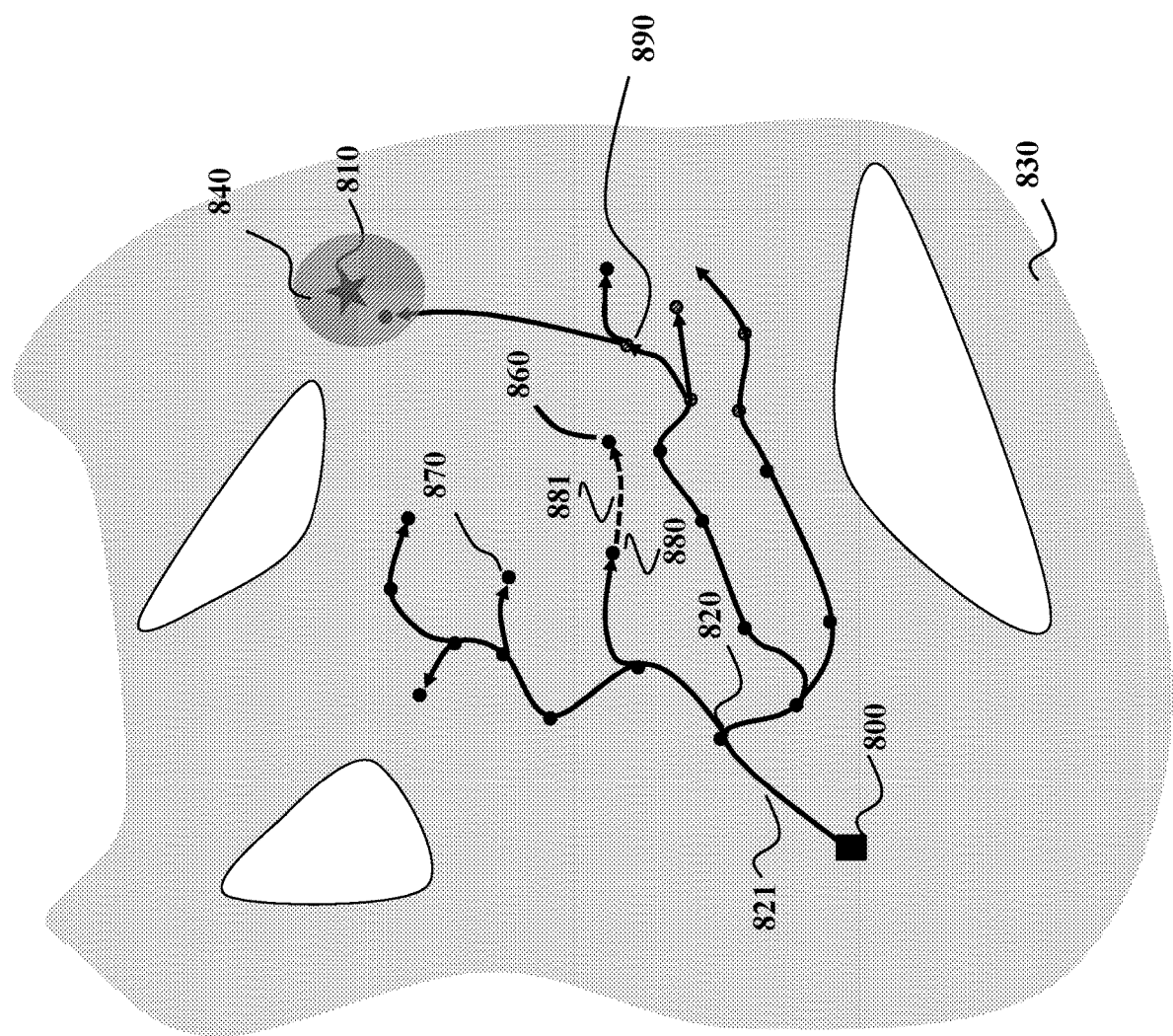
FIG. 8 shows a schematic of a tree of state transitions defining the motion of the vehicle according to some embodiments of the invention.

FIG. 8 shows a schematic of a tree of state transitions defining the motion of the vehicle according to some embodiments of the invention. The current tree in the drivable space 830 is shown with root node 800 indicating the current state of the vehicle and the tree includes the states as nodes and the state transitions as edges in state space, arising from control inputs chosen according to other embodiments of the invention. For example, edge 821 is the motion generated by applying a control input for a pre-defined time from root node 800 to state 820. The tree can include a target state 810 and target region 840 of the vehicle. In some embodiments of the invention, there could be several target states 810 and target regions 840. A probability can be associated to the control input generating edge 821 and therefore also state 820, which can account for uncertainties in the dynamical model of the vehicle as well as uncertainties in the sensing and estimation of the obstacles and the surrounding environment of the vehicle.

In some embodiments, the edges 821 are created by evaluating a control input over several time instants, whereas other embodiments determine a new control input for each time instant, where the determination of control inputs is described according to other embodiments of the inventions. In other embodiments, the edges 821 are created by aggregating several control inputs over one or several time instants. In expanding the tree toward the target region 840, an initial state is selected, a control input is determined, and a corresponding state sequence and final state is determined. For example, 880 can be the selected state, 881 can be the trajectory, which is added as an edge to the tree, and 860 is the final state, added as a node to the motion planning tree.

Figure 9A:
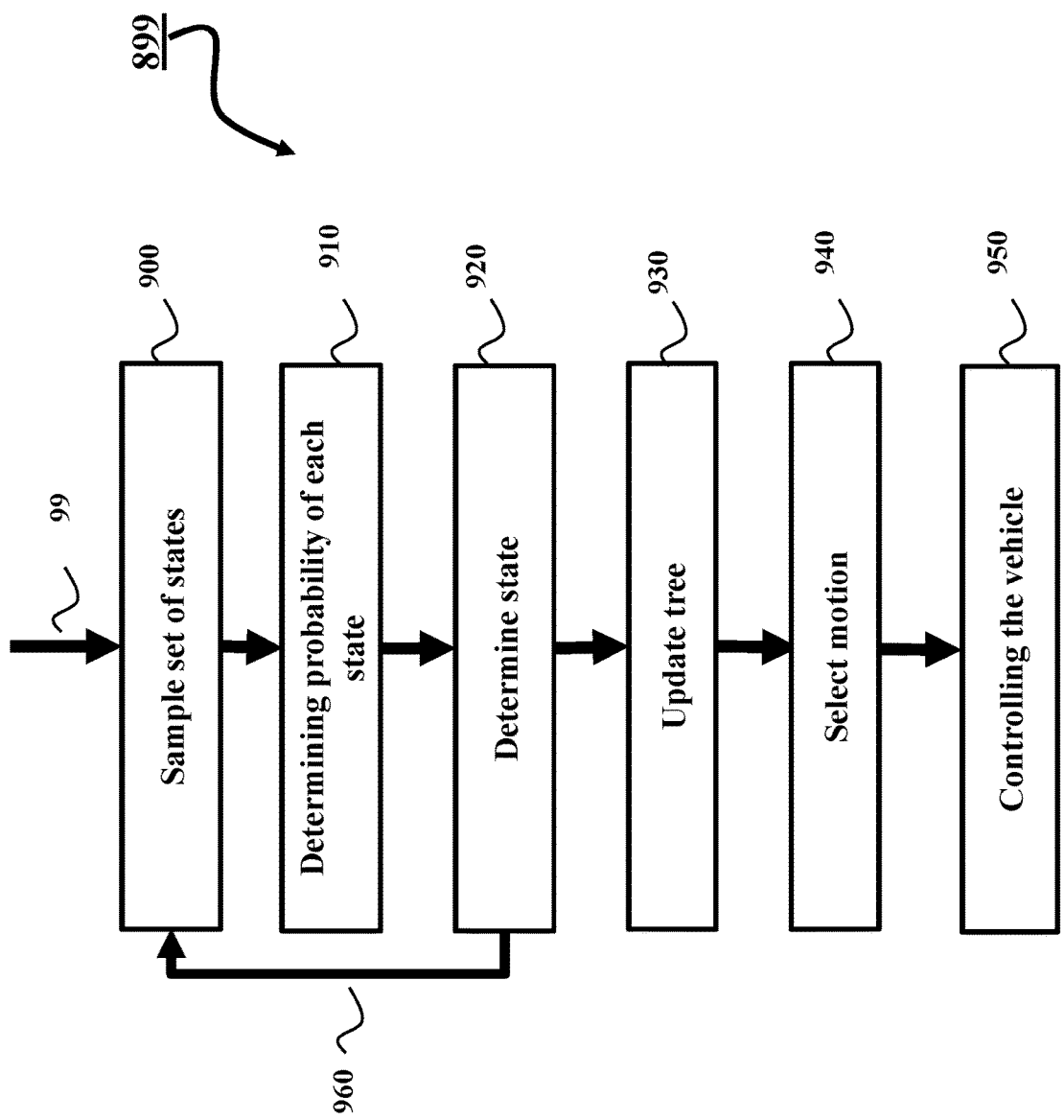
FIG. 9A shows a flowchart of a probabilistic motion planner for determining the sequence of vehicle states and probability distributions according to some embodiments of the invention.

FIG. 9A shows a flowchart of a probabilistic motion planner 899 for determining the sequence of states and distributions according to some embodiments of the invention. In some embodiments, the probabilistic motion planner 899 is a particle filter propagating in time a set of particles to represent a set of likelihoods of the target state at an instance of time. Each particle includes a Gaussian distribution of values of the target state at the instance of time, wherein the first order moment of the parametric probability distribution for the instance of time is a weighted mean of the particles, while the higher order moment of the parametric probability distribution for the instance of time is a weighted covariance of the particles. The method determines iteratively a sequence of control inputs specifying the motion of the vehicle from an initial state of the vehicle to a target state of the vehicle. In different embodiments, the initial state is a current state of the vehicle and/or wherein the initial state is the state corresponding to the control input determined during a previous iteration of the method.

The motion is defined by the state transitions connecting states of the vehicle, for example, as shown in FIG. 8. Each state includes a location, a velocity, and a heading of the vehicle. The motion is determined iteratively until a termination condition is met, for example, for a time period or for a predetermined number of iterations. An iteration of the method of FIG. 9A includes the following steps.

The method determines 900 an initial state, a set of sampled states and a corresponding set of state transitions such that a particular state transition with a corresponding high probability is relatively consistent with the subset of control objective functions. For example, the method determines the state 880, the state transition 881, and the state 860 in FIG. 8.

In some embodiments of the invention, the sampled states 900 are generated by using the probabilistic control functions, i.e., the states are sampled according to the probability density function corresponding to a subset of control functions. For example, a probabilistic function $q(x_{k+1}|x_k, y_{k+i})$ can be used to generate states, where q is a function of the state at time index k+1, given the state at the time index k and the control function at time index k+1.

As a particular example, if the noise on the motion model and the control functions are Gaussian, Gaussian density functions, q can be chosen as $$q(x_{k+1}|x_k^i, y_{k+1}) = p(x_{k+1}|x_k^i, y_{k+1}) = N\left(x_{k+1}\Big|x_{k+1}^i, \left(\sum\right)_{k+1}^{-1}\right),$$

where $x_{k+1}^i = f(x_k^i) + w_k^i + L_k^i(y_{k+1} - H_k^i f(x_k^i))$, $$\sum\nolimits_{k+1}^i = \left((H_k^i)^T R_{k+1}^{-1}(H_k^i) + Q_k^{-1}\right)^{-1},$$

and $L_k^i = (Q_k (H_k^i)^T (H_k^i Q_k (H_k^i)^T + R_{k+1}^{-1})^{-1}$, $$H_k^i = \frac{\partial h}{\partial x},$$

that is, the states can be generated as a random sample from a combination of the noise source of the dynamical system and the probabilistic control functions.

In one embodiment of the invention, the generation of the sampled states 900 is executed in a loop, where the number of iterations is determined beforehand. In another embodiment, the generation of states 900 is done based on a requirement of T time steps ahead in time. For example, the number of iterations T can be determined as a fixed number of steps, or the number of iterations can be determined as a function of the resolution of the sensors of the sensing system. When 900 is executed T time steps, the inputs are generated according to all probabilistic control functions from time index k+1 to time index k+T, that is, $q(x_{k+1}|x_k, y_{k+i}, \ldots, y_{k+T})$.

Figure 9B:
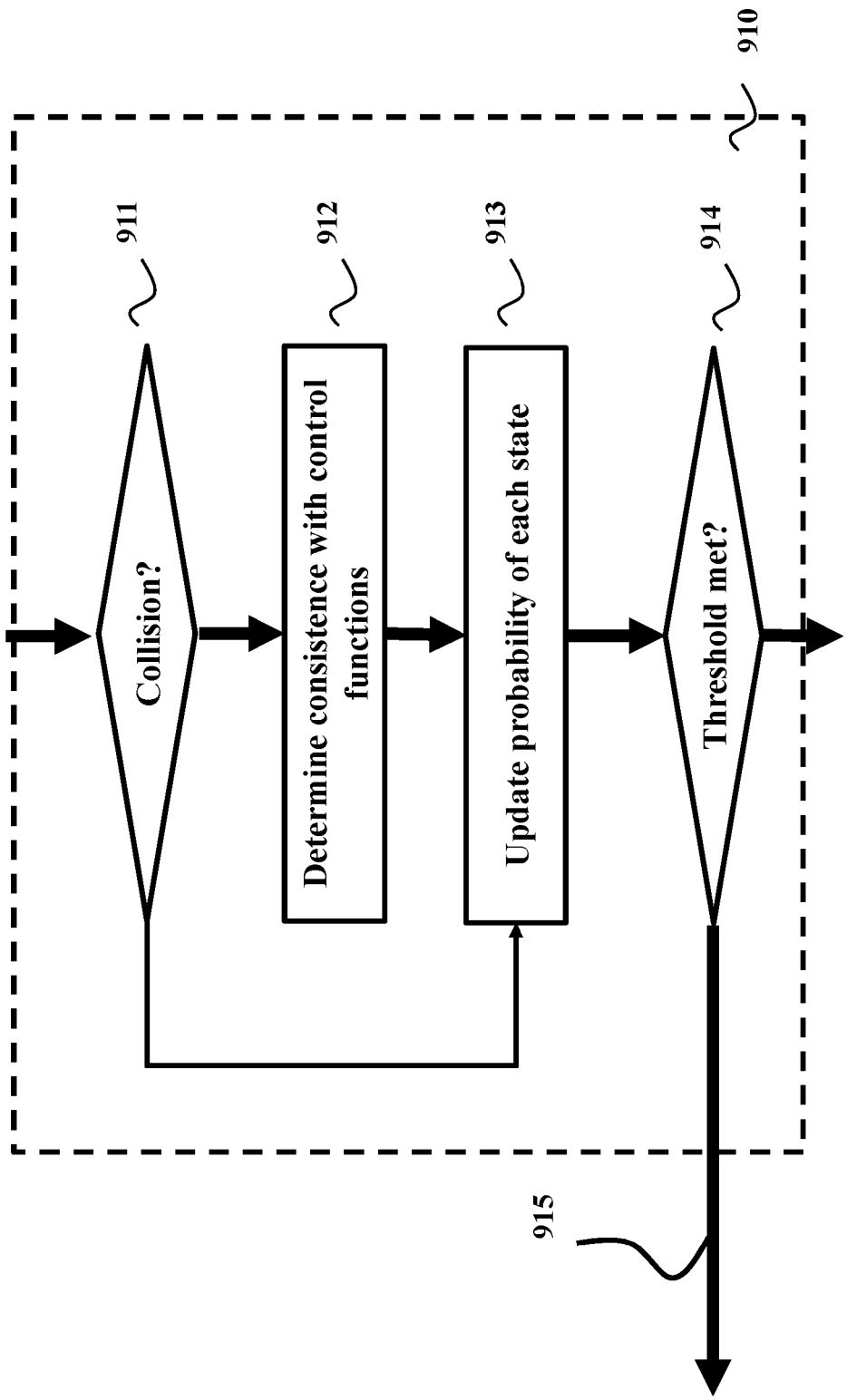
FIG. 9B shows a flowchart of the method that determines the probability of each state being consistent with the probabilistic control functions.

FIG. 9B shows a flowchart of the method 910 that determines the probability of each state being consistent with the probabilistic control functions. When determining the probability of each state, the state is first checked for collision 911. If the next state and the state transition leading up to the state is collision free, consistence of the state with a subset of control functions is determined 912 and the probability of each state is computed 913.

In one embodiment, if the collision check 911 determines that the next state $x_{k+1}^i$ collides with an obstacle, the probability of that particular state can be set to zero. The collision check can be deterministic, or it can be probabilistic, where a collision can be assumed to happen if the probability of a collision is above some threshold, where the prediction of obstacles is done according to a probabilistic motion model of the obstacle.

Figure 9C:
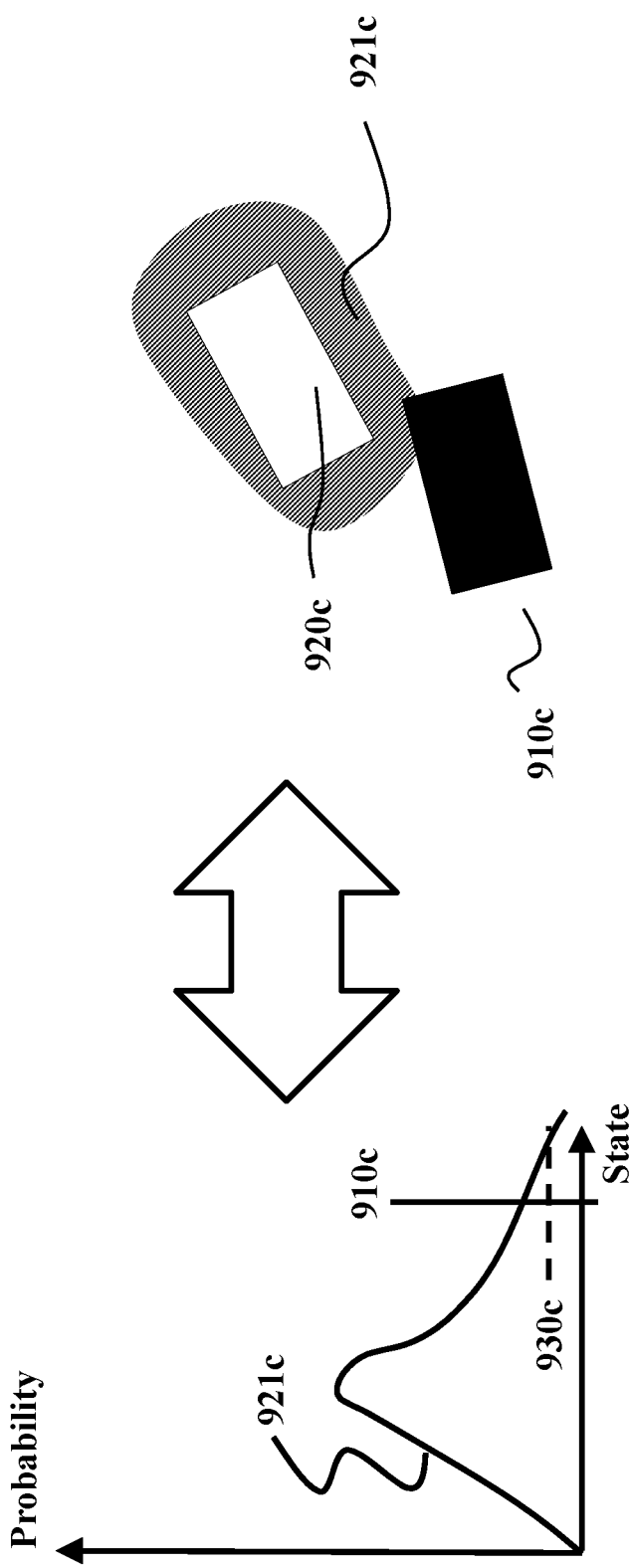
FIG. 9C shows an example where the prediction of the location of the autonomous vehicle intersects with the uncertainty region of the obstacle, and where the probability of the obstacle being at the location is higher than a particular collision threshold value.

FIG. 9C shows an example where the prediction of the location 910c of the autonomous vehicle intersects with the uncertainty region 921c of the obstacle 920c, and where the probability of the obstacle 920c being at the location 910c is higher than a collision threshold 930c. For example, a sensor of the vehicle can determine a position of an obstacle as a function of time. The motion-planning system determines a probability of the next state to intersect with an uncertainty region of the obstacle and assigns a zero probability to the sampled state when the probability of the next state to intersect with the uncertainty region of the obstacle is above a collision threshold.

In another embodiment of the method 910, if the aggregated probability is below a threshold 914, where the threshold can be predetermined, states have a low probability of being consistent with the control functions, so the method exits 915 and restarts the motion planning algorithm 899.

In some embodiments of the invention, the determining 912 is done as a combination of the probability density function (PDF) of the probabilistic control functions, $p(y_{k+1}|x_{k+1}^i)$, the next state, and the probability $\omega_k^i$ of the state determined during the previous cycle 960. For example, if states are generated according to the dynamic model of the vehicle, the probabilities are proportional to the PDF of the control functions, i.e., $\omega_{k+1}^i \propto P(y_{k+1}|x_{k+1}^i)\omega_k^i$. As another example, if the sampling of states is done according to $p(x_{k+1}|x_k^i, y_{k+1})$, as explained above, the probabilities are proportional to the prediction of the PDF of the probabilistic control functions, that is, $\omega_{k+1}^i \propto p(y_{k+1}|x_k^i)\omega_k^i$. In some embodiments of the invention, the probabilities are normalized in such a way that they represent a PDF.

In one embodiment of the invention, states with nonzero but low probability are in some time steps replaced with states with higher probabilities. For example, one embodiment generates a new set of states in such a way that the probability of generating $x_k^i$ is $\omega_k^i$. In another embodiment, the replacement is performed whenever the inverse square sum of the probabilities is below some predefined threshold. Doing in such a manner ensures that only probably good states are used.

The determining 920 of the state can be done in several ways. For example, one embodiment determines control input by using a weighted average function to produce the state as $$x_{k+1} = \sum\nolimits_{i=1}^N \omega_{k+1}^i x_{k+1}^i.$$

Another embodiment determines state as the state with highest probability, that is, $i=\mathrm{argmax}\,\omega_{k+1}^i$. Additionally or alternatively, one embodiment determines the state by averaging over a fixed number m<N of sampled states.

Figure 9D:
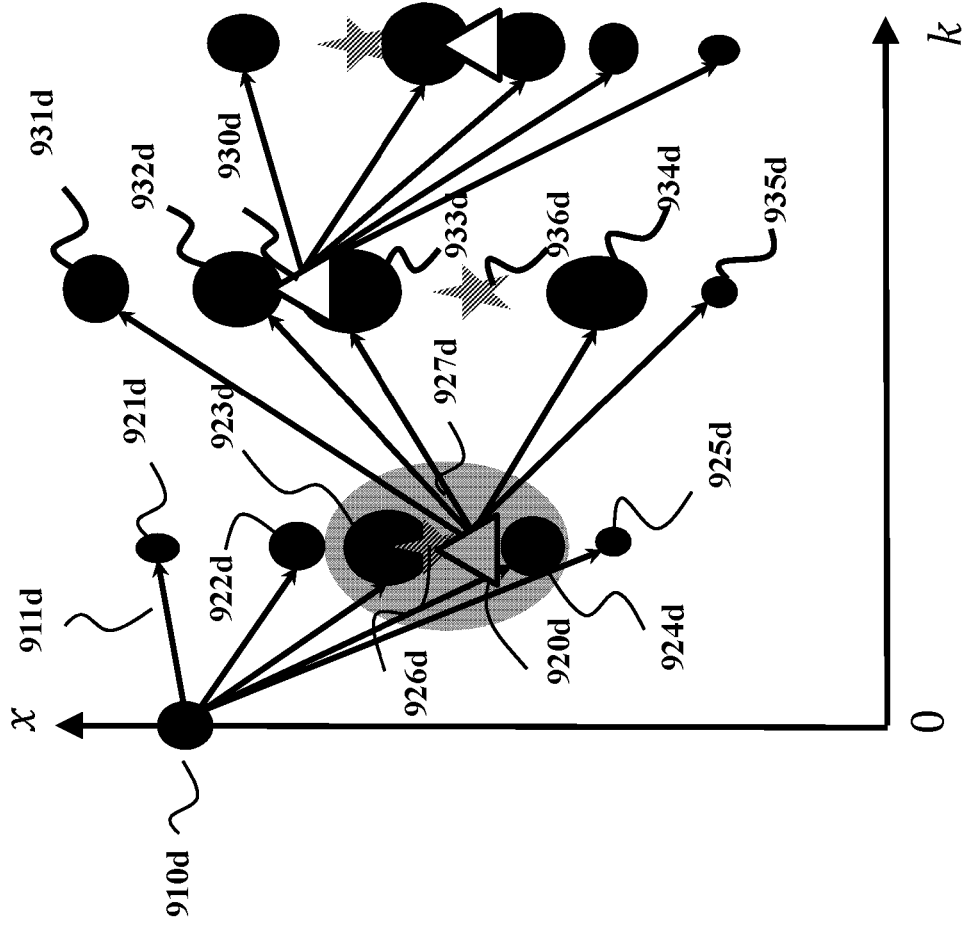
FIG. 9D shows a simplified schematic of the result of three iterations of steps for generating states consistent with probabilistic control functions.

FIG. 9D shows a simplified schematic of the result of three iterations of steps 900, 910 and 920 when five sampled states are generated for each iteration. The initial state 910d is predicted forward in time 911d using the dynamical model of the vehicle motion and the probabilistic control functions, and five next states are 921d, 922d, 923d, 924d, and 925d. The probabilities are determined as a function of the probabilistic control functions 926*d* and the probabilistically allowed deviation 927*d* of the control functions 926*d*. At each time step, i.e., at each iteration, an aggregate of the probabilities is used to produce an aggregated control input and corresponding state 920*d*. In some implementations, the probabilistic functions act to propagate particles representing likelihoods of target states in time. In these implementations, each state, e.g., 921*d*, 922*d*, 923*d*, 924*d*, and 925*d*, is a particle.

Figure 9E:
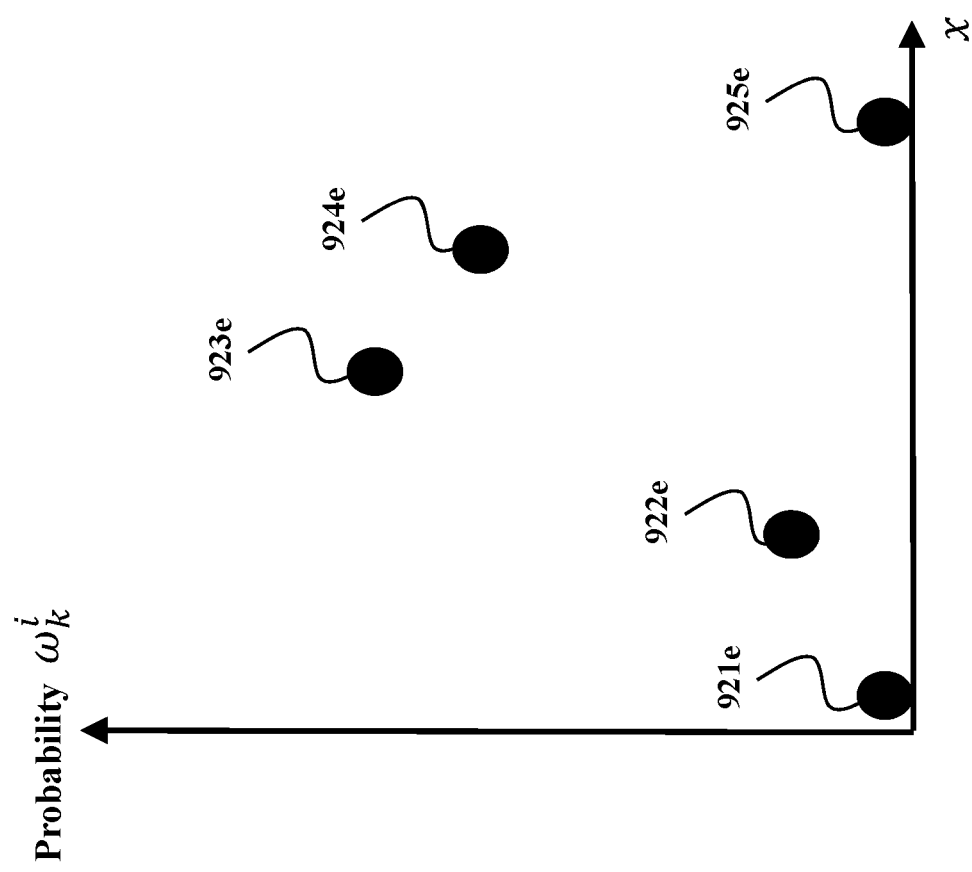
FIG. 9E shows possible assigned probabilities of the five states at the first iteration in FIG. 9D.

FIG. 9E shows possible assigned probabilities of the five states at the first iteration in FIG. 9D. The values of probabilities 921*e*, 922*e*, 923*e*, 924*e*, and 925*e* are reflected in selecting the relative sizes of the dots illustrating the states 921*d*, 922*d*, 923*d*, 924*d*, and 925*d*.

Determining the sequence of probability distributions amounts to determining the distribution of probabilities such as those in FIG. 9E for each time step in the sequence. For instance, the distribution can be expressed as the discrete distribution as in FIG. 9E, or the discrete states associated with probabilities can be made continuous using e.g. a kernel density smoother.

Referring back to FIG. 9D, the state 920*d* becomes the initial state for the next iteration that again produces five sampled states 931*d*, 932*d*, 933*d*, 934*d*, and 935*d*. The state 930*d* is selected according to the probabilities of the sampled states of this iteration. The state 930*d* is the initial state for the next iteration.

Some embodiments update a tree G=(V,E) of nodes and edges as follows 930. If it is the first iteration of the method 900, the tree is initialized with the current state and the edges are empty. Otherwise, the sequence of aggregated states and sequence of control inputs determined in 900-920 are added as nodes and the trajectories connecting the states are added as edges. For example, 860 in FIG. 8 is an added node and the corresponding edge is 881. Alternatively, in one embodiment all generated states are added to the tree, in which case the determining 920 can be circumvented.

FIGS. 10A through 10D show an illustration of a subset of possible control functions and their respective deterministic and probabilistic components according to some embodiments of the invention.

Figure 10A:
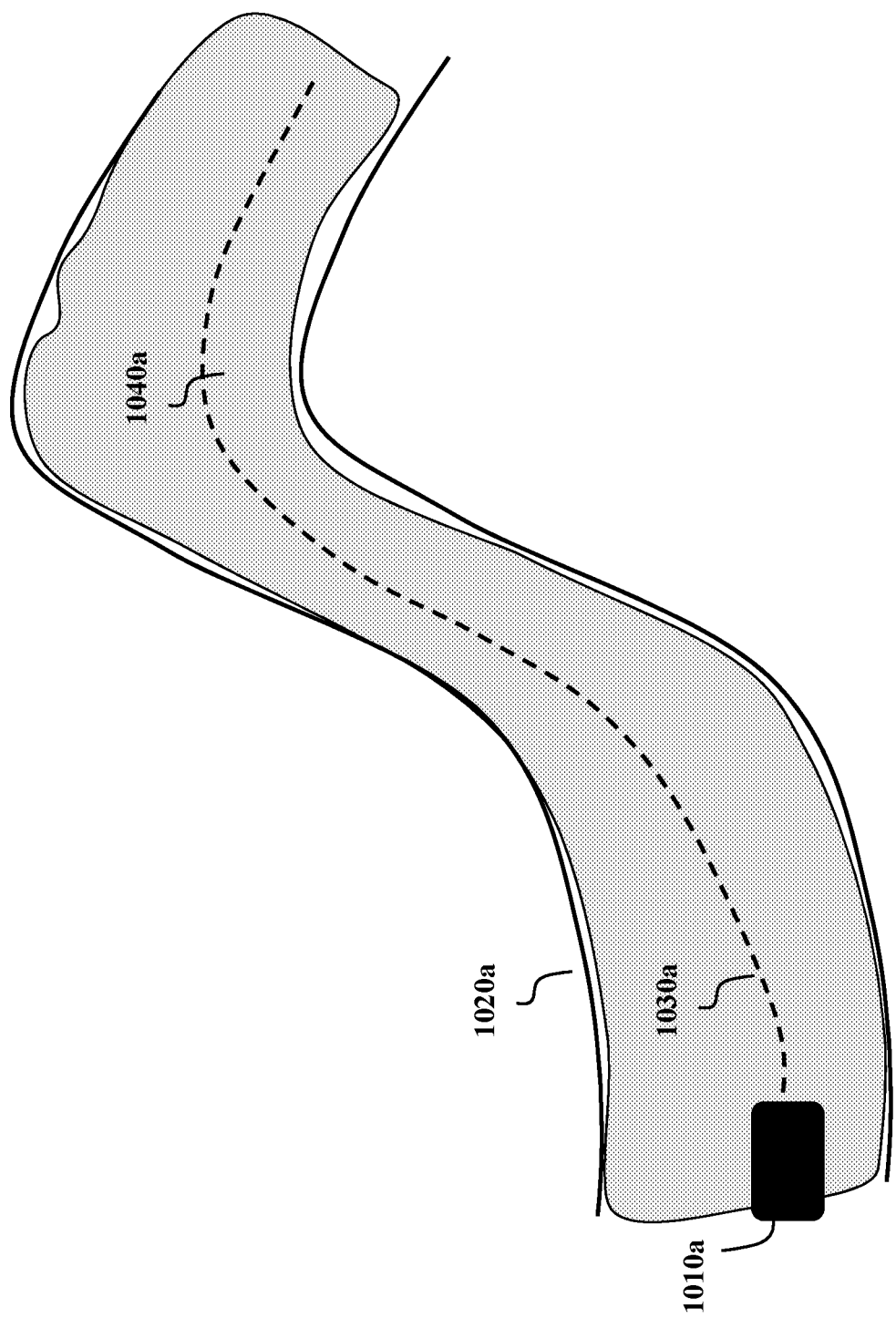
FIG. 10A shows an illustration of the control function corresponding to the control objective keeping the vehicle on the road.

FIG. 10A shows an illustration of the control function corresponding to the control objective keeping the vehicle 1010*a* on the road 400, wherein the road boundaries are defined by 1020*a*. The control function is defined by the deterministic component 1030*a* and the probabilistic component 1040*a*. The deterministic component can be determined, for example, by recording data of human drivers and optimizing the fit, for example, by minimizing the average Euclidean distance to the data or by maximizing the probability of being a good fit. The probabilistic component 1040*a* can be determined by determining the variation of the recorded data around the deterministic component 1030*a*. For example, the probabilistic component 1040*a* can be determined by maximizing the probability of including all of the recorded data inside the variation of the probabilistic component 1040*a*, or it can be determined by estimating the actual variation of an infinite amount of data given the finite amount of recorded data.

Figure 10B:
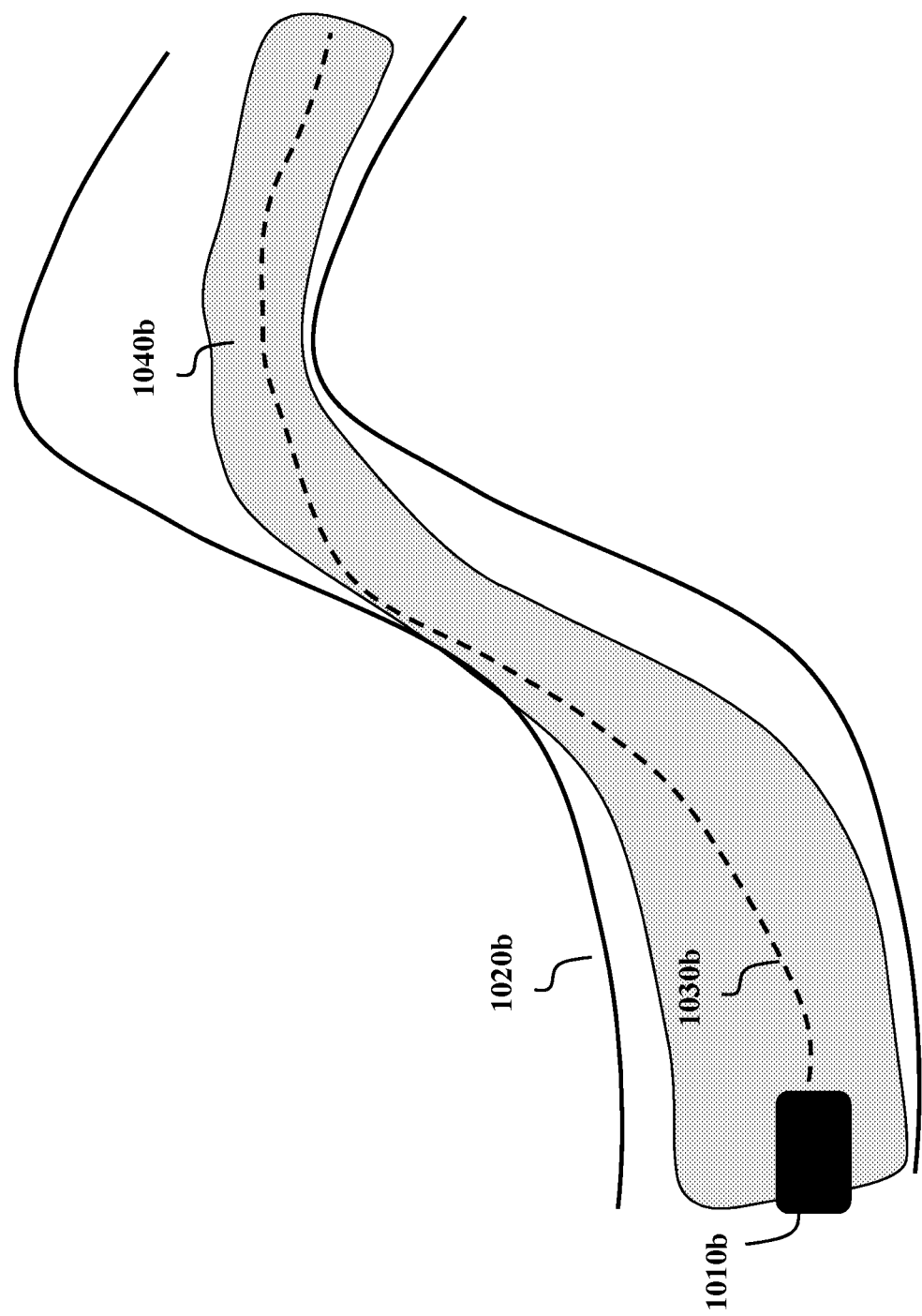
FIG. 10B shows an illustration of the control function corresponding to the control objective shortening the vehicle travel time on the road.

Some embodiments are based on the recognition that while it is possible to model a control function as one limited by the road boundaries 1020*a*, this is not the way humans drive. Instead, humans may decide to cut corners in turns to provide for a shorter ride. FIG. 10B shows an illustration of the control function corresponding to the control objective shortening the vehicle 1010*b* travel time on the road, wherein the road boundaries are defined by 1020*b*. The control function is defined by the deterministic component 1030*b* and the probabilistic component 1040*b*. According to some embodiments of the invention, the reference tracking cost in the linear or nonlinear MPC controller can be adapted automatically based on the time-varying first and higher order moments of the probability distributions that are computed by the probabilistic motion planner, using the deterministic 1030*b* and the probabilistic component 1040*b* for each of the control objectives.

Figure 10C:
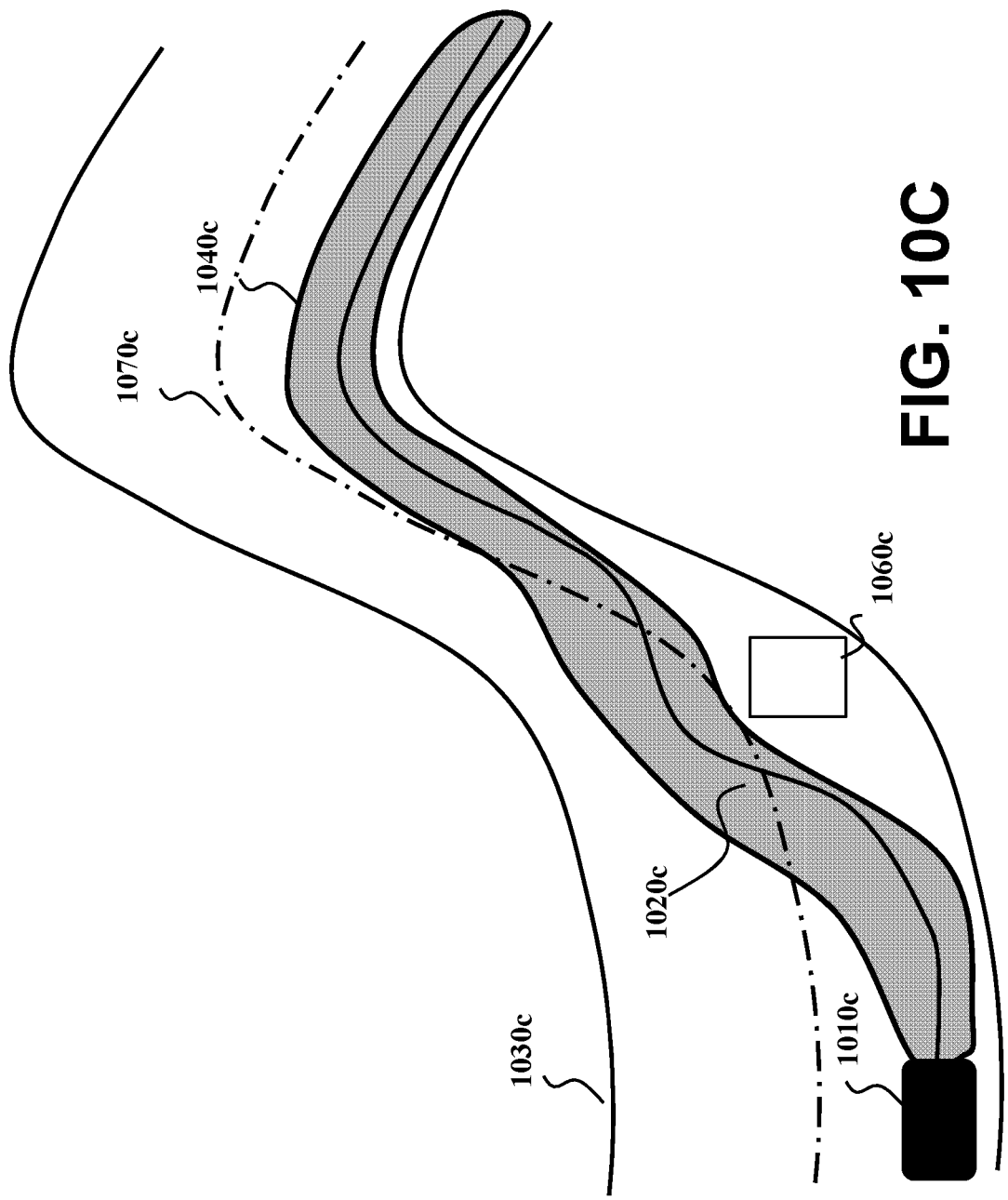
FIG. 10C shows an illustration of a control function for expressing the driving objective of safely overtaking an obstacle.

FIG. 10C shows an illustration of a control function for expressing the driving objective of safely overtaking an obstacle 1060*c*, wherein the vehicle 1010*c* drives on a two-lane road with lane boundary 1070*c*. FIG. 10C illustrates a scenario where the autonomous or semi-autonomous vehicle needs to perform a maneuver for obstacle avoidance. The latter can be necessary when it is likely impossible to safely stay in the middle of the current lane, because of either static or dynamic obstacles on the side of that lane (e.g., pedestrians, bicycles and stopped or parked vehicles), and it is impossible or undesirable to change to another lane, e.g., due to traffic rules or when the other lane may be currently blocked. The deterministic component 1020*c* can for example be determined from data collected from human drivers in similar situations. The probabilistic component 1040*c* indicates that not every situation is the same, and that drivers typically behave slightly different depending on how the obstacle 1060*c* behaves.

Consequently, the probabilistic component 1040*c* indicates a larger variation in the area where the overtaking is executed. In some embodiments of the invention, this larger variation in the area where the overtaking is executed can result in a reduction of the corresponding weights in the reference tracking cost terms of the adaptive MPC controller. This allows the MPC reference tracking algorithm to automatically adapt the tradeoff that exists between competing control objectives such as, e.g., achieving high tracking performance while satisfying safe obstacle avoidance requirements. More specifically, one could expect the uncertainty of the reference motion plan to increase when the vehicle is predicted to become relatively close to surrounding obstacles, such that the penalization of deviations from the reference trajectories should decrease, and vice versa. This in turn allows larger, or lower, deviations of the NMPC trajectory from its reference, i.e., the motion planning trajectory.

Figure 10D:
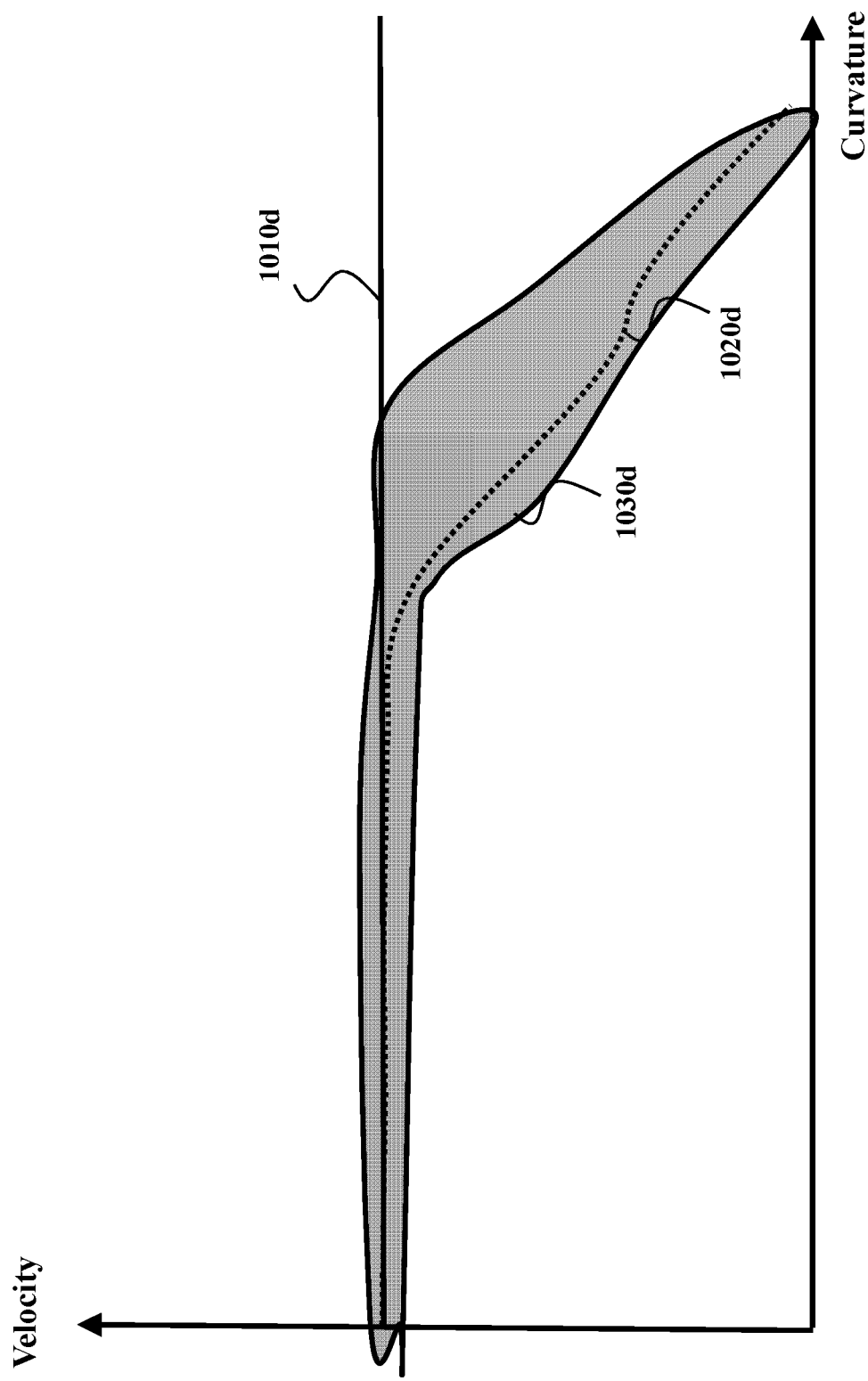
FIG. 10D shows an illustration of a possible way to describe a control function of the objective to maintain the current speed according to some embodiments.

FIG. 10D shows an illustration of a possible way to describe a control function of the objective to maintain the current speed 420 according to some embodiments. FIG. 10D shows a case where the velocity is modeled as a function of the curvature of the road, i.e., a measure of the turning radius of the road. For small curvature, i.e., almost straight road, the control function has a deterministic component 1020*d* that is equal to the current speed 1010*d*. However, as the curvature increases the current speed is harder to maintain, and the deterministic component reduces to zero. Moreover, as shown in FIG. 10D, for small curvature the probabilistic component 1030*d* is centered around the nominal speed with small variation. However, as curvature increases there is a larger non-symmetric variation to reflect the larger variation of speeds a driver exerts. In some embodiments of the invention, for large curvature of the road, this larger variation in the desired speed can result in a reduction of the corresponding weights in the reference tracking cost terms of the adaptive MPC controller. For small curvature of the road, the smaller variation in the desired speed can result in an increase of the corresponding weights in the MPC reference tracking cost terms.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A system for controlling a vehicle, comprising:
an input interface configured to accept a current state of the vehicle, an image of an environment in proximity to the current state of the vehicle, and a destination of the vehicle;
a memory configured to store a probabilistic motion planner and an adaptive predictive controller, wherein the probabilistic motion planner is configured to accept the current state of the vehicle, the destination of the vehicle, and the image of the environment to produce a sequence of parametric probability distributions over a sequence of target states defining a motion plan for the vehicle, wherein parameters of each parametric probability distribution define a first order moment and at least one higher order moment of the probability distribution, wherein the adaptive predictive controller is configured to optimize a cost function over a prediction horizon to produce a sequence of control commands to one or multiple actuators of the vehicle, wherein the optimization of the cost function balances a cost of tracking of different state variables in the sequence of the target states defined by the first moments, wherein the different state variables are weighted using one or multiple of the higher order moments of the probability distribution in the balancing of the cost of tracking;
a processor configured to execute the probabilistic motion planner by submitting the current state of the vehicle, the destination of the vehicle, and the image of the environment to the probabilistic motion planner and configured to execute the adaptive predictive controller by submitting the sequence of the parametric probability distributions produced by the probabilistic motion planner to the adaptive predictive controller to produce the sequence of control commands; and
an output interface configured to output at least one control command determined by the adaptive predictive controller to at least one actuator of the vehicle.

2. The system of claim 1, wherein the higher order moments of the probability distributions indicate confidence of the probabilistic motion planner about the motion plan for the vehicle, wherein the adaptive predictive controller increases the weight of the tracking in the balancing optimization with an increase of the confidence allowing lower deviation of the predicted vehicle state values from the sequence of target states and decreases the weight of the tracking in the balancing optimization with a decrease of the confidence allowing larger deviation of the predicted vehicle state values from the sequence of target states.

3. The system of claim 1, wherein a rate of execution of the adaptive predictive controller is greater than a rate of execution of the probabilistic motion planner, such that the processor executes the adaptive predictive controller at least once for each execution of the probabilistic motion planner.

4. The system of claim 3, wherein the motion plan defines the sequence of parametric probability distributions over the sequence of target states as a function of time for a period greater than the prediction horizon.

5. The system of claim 1, wherein each target state of the vehicle includes multiple state variables, such that each parametric probability distribution is a multi-variable distribution defining parameters for the distribution of each state variable, such that the first moment of the parametric probability distribution is a mean value, and the higher order moment of the parametric probability distribution is a covariance matrix with values varying in space and time.

6. The system of claim 1, wherein the probabilistic motion planner includes a particle filter propagating in time a set of particles to represent a set of likelihoods of the target state at an instance of time, such that each particle includes a Gaussian distribution of values of the target state at the instance of time, wherein the first order moment of the parametric probability distribution for the instance of time is a weighted mean of the particles, while the higher order moment of the parametric probability distribution for the instance of time is a weighted covariance of the particles.

7. The system of claim 1, wherein the adaptive predictive controller is a model predictive controller (MPC) with the cost function formulated as a time-varying stage-wise least squares cost function including the tracking cost weighted with time-varying positive-definite weighting matrices with values that are derived from the higher order moments of the probability distributions.

8. The system of claim 7, wherein the values of the time-varying positive-definite weighting matrices are inverse proportional to values of a sequence of covariance matrices that are formed by the higher order moments of the probability distributions.

9. The system of claim 8, wherein the higher order moments of the parametric probability distribution are determined separately for each control objective and the MPC tracking cost is weighted with time-varying positive-definite diagonal weighting matrices, and each of the diagonal values is computed based on an inverse proportional relation to each of the corresponding individual higher order moments of the parametric probability distributions.

10. The system of claim 9, wherein the adaptive predictive controller uses time-varying positive-definite weighting matrices in the tracking cost that are computed as a stage-wise scaled inverse of the sequence of covariance matrices of the parametric probability distributions from the probabilistic motion planner.

11. The system of claim 10, wherein the inverse relation between the weighting matrices and covariance matrices includes a performance-specific scaling that can be relatively different for each of the tracking control objectives and a saturation function that bounds each of the time-varying positive-definite weighting matrices between lower and upper bounds for the weighting of each of the control objectives in the tracking cost function.

12. The system of claim 11, wherein the processor uses only diagonal values of the covariance matrices to compute diagonal values of the weighting matrices, such that the weighting matrices are diagonal matrices.

13. The system of claim 1, wherein the optimization of the cost function balances a cost of tracking the sequence of the target states defined by the first moments of the parametric probability distributions against a cost of at least one other metric of the motion of the vehicle, wherein an importance of the tracking cost is weighted using one or multiple of the higher order moments of the probability distribution in the balancing optimization.

14. The system of claim 1, wherein the adaptive predictive controller is a model predictive controller (MPC) optimizing the balancing cost function using a constrained optimization subject to active constraints selected based on control objectives, wherein the adaptive predictive controller feedbacks the active constraints to the probabilistic motion planner configured to adjust the higher order moments of the probabilistic distribution based on type and/or number of the active constraints.

15. The system of claim 1, wherein the probabilistic motion planner uses a set of control functions, wherein each control function is configured to transition the current state of the vehicle into a target state based on its corresponding objective of control, wherein at least some of the control functions are probabilistic and include a deterministic component for transitioning the current state into the target state and a probabilistic component for determining a probabilistic distribution of values around the target state determined by the deterministic component, such that an output of the probabilistic control function is a parametric probability distribution over the target state defining a first moment and at least one higher order moment of the probability distribution.

16. A method for controlling a vehicle, wherein the method uses a processor coupled to a memory storing a probabilistic motion planner and an adaptive predictive controller, wherein the probabilistic motion planner is configured to accept the current state of the vehicle, the destination of the vehicle, and the image of the environment to produce a sequence of parametric probability distributions over a sequence of target states defining a motion plan for the vehicle, wherein parameters of each parametric probability distribution define a first order moment and at least one higher order moment of the probability distribution, wherein the adaptive predictive controller is configured to optimize a cost function over a prediction horizon to produce a sequence of control commands to one or multiple actuators of the vehicle, wherein the optimization of the cost function balances a cost of tracking of different state variables in the sequence of the target states defined by the first moments, wherein the different state variables are weighted using one or multiple of the higher order moments of the probability distribution in the balancing of the cost of tracking, wherein the processor is coupled with stored instructions implementing the method, wherein the instructions, when executed by the processor carry out steps of the method, comprising:

accepting a current state of the vehicle, an image of an environment in proximity to the current state of the vehicle, and a destination of the vehicle;

executing the probabilistic motion planner by submitting the current state of the vehicle, the destination of the vehicle, and the image of the environment to the probabilistic motion planner;

executing the adaptive predictive controller by submitting the sequence of the parametric probability distributions produced by the probabilistic motion planner to the adaptive predictive controller to produce the sequence of control commands; and submitting at least one control command determined by the adaptive predictive controller to at least one actuator of the vehicle.

17. The method of claim 16, wherein the optimization of the cost function balances a cost of tracking the sequence of the target states defined by the first moments of the parametric probability distributions against a cost of at least one other metric of the motion of the vehicle, wherein an importance of the tracking cost is weighted using one or multiple of the higher order moments of the probability distribution in the balancing optimization.

18. The method of claim 16, wherein the adaptive predictive controller is a model predictive controller (MPC) with the cost function formulated as a time-varying stage-wise least squares cost function including the tracking cost weighted with time-varying positive-definite weighting matrices with values that are derived from the higher order moments of the probability distributions.

19. The method of claim 18, wherein the values of the time-varying positive-definite weighting matrices are inverse proportional to values of a sequence of covariance matrices that are formed by the higher order moments of the probability distributions.

20. A non-transitory computer readable storage medium embodied thereon a program executable by a processor for performing a method, wherein the medium stores a probabilistic motion planner and an adaptive predictive controller, wherein the probabilistic motion planner is configured to accept the current state of the vehicle, the destination of the vehicle, and the image of the environment to produce a sequence of parametric probability distributions over a sequence of target states defining a motion plan for the vehicle, wherein parameters of each parametric probability distribution define a first order moment and at least one higher order moment of the probability distribution, wherein the adaptive predictive controller is configured to optimize a cost function over a prediction horizon to produce a sequence of control commands to one or multiple actuators of the vehicle, wherein the optimization of the cost function balances a cost of tracking of different state variables in the sequence of the target states defined by the first moments, wherein the different state variables are weighted using one or multiple of the higher order moments of the probability distribution in the balancing of the cost of tracking, the method comprising:

accepting a current state of the vehicle, an image of an environment in proximity to the current state of the vehicle, and a destination of the vehicle;

executing the probabilistic motion planner by submitting the current state of the vehicle, the destination of the vehicle, and the image of the environment to the probabilistic motion planner;

executing the adaptive predictive controller by submitting the sequence of the parametric probability distributions produced by the probabilistic motion planner to the adaptive predictive controller to produce the sequence of control commands; and submitting at least one control command determined by the adaptive predictive controller to at least one actuator of the vehicle.

* * * * *